(12) United States Patent
Swessel et al.

(10) Patent No.: US 8,590,087 B2
(45) Date of Patent: Nov. 26, 2013

(54) LIGHTING AND SIGNALING SYSTEMS FOR LOADING DOCKS

(75) Inventors: Mark R. Swessel, Milwaukee, WI (US); Timothy Muhl, Slinger, WI (US); Bradley J. Stone, Port Washington, WI (US)

(73) Assignee: Rite-Hite Holding Corporation, Milwaukee, WI (US)

( * ) Notice: Subject to any disclaimer, the term of this patent is extended or adjusted under 35 U.S.C. 154(b) by 868 days.

(21) Appl. No.: 12/698,548

(22) Filed: Feb. 2, 2010

(65) Prior Publication Data

US 2010/0146719 A1 Jun. 17, 2010

Related U.S. Application Data

(63) Continuation-in-part of application No. 11/945,075, filed on Nov. 26, 2007, and a continuation-in-part of application No. 11/011,721, filed on Dec. 14, 2004, now Pat. No. 7,380,375.

(51) Int. Cl.
*E01D 1/00* (2006.01)

(52) U.S. Cl.
USPC ............... 14/71.3; 14/69.5; 14/71.1; 14/71.5; 340/286.01; 340/332; 340/573.1; 340/958; 29/428

(58) Field of Classification Search
USPC ........ 340/573.1, 572.1–572.9, 573.4, 286.01, 340/332, 958; 14/69.5, 71.1, 71.3, 1.5, 14/71.5; 29/428; 700/17; 362/147, 153, 362/240, 373, 396, 397, 427, 430, 800
See application file for complete search history.

(56) References Cited

U.S. PATENT DOCUMENTS

| 209,257 A | 10/1878 | Hadley et al. |
| 218,546 A | 8/1879 | McAneny et al. |

(Continued)

FOREIGN PATENT DOCUMENTS

| CN | 2116072 | 9/1992 |
| CN | 2161731 | 4/1994 |
| WO | 2006066013 | 6/2006 |

OTHER PUBLICATIONS

Canadian Intellectual Property Office, "Office Communication," issued in connection with Canadian application serial No. 2,705,359, mailed Dec. 29, 2010, 2 pages.

(Continued)

*Primary Examiner* — Steven Lim
*Assistant Examiner* — Sisay Yacob
(74) *Attorney, Agent, or Firm* — Hanley, Flight & Zimmerman, LLC.

(57) ABSTRACT

A safety system for a truck loading dock with an elevated platform provides an alarm that warns of a hazard at the loading dock such as a forklift operating inside the truck or a falling hazard that may exist due to the dock door being open while a truck is not present at the dock. In cases where a dock's open doorway is protected by a barrier that can be opened or closed, the alarm can be de-activated by closing the barrier. In some examples, the safety system includes a remote body sensor that detects when someone or something is near the doorway. In response to the body sensor, a second, more pronounced alarm can warn of more imminent danger where someone on the platform may be too close to an open doorway when a truck is not present.

19 Claims, 19 Drawing Sheets

(56) References Cited

U.S. PATENT DOCUMENTS

| | | | |
|---|---|---|---|
| 516,486 A | 3/1894 | Hartshorn |
| 774,881 A | 11/1904 | Ingersoll |
| 778,228 A | 12/1904 | Dodge et al. |
| 824,930 A | 7/1906 | Hopkins |
| 859,489 A | 7/1907 | Donovan et al. |
| 1,120,055 A | 12/1914 | Hart et al. |
| 1,368,844 A | 2/1921 | Sawin |
| 1,477,159 A | 12/1923 | Zinser |
| 1,652,186 A | 12/1927 | Strauss |
| 1,666,508 A | 4/1928 | Sawyer |
| 1,698,424 A | 1/1929 | Banschbach |
| 1,828,296 A | 10/1931 | Sawyer |
| RE18,940 E | 9/1933 | Traut |
| 2,088,046 A | 7/1937 | White |
| 2,282,914 A | 5/1942 | Vetterlein |
| 2,295,205 A | 9/1942 | Fraser |
| 2,563,770 A | 8/1951 | Yantes et al. |
| 2,563,894 A | 8/1951 | White |
| 2,678,691 A | 5/1954 | Rust et al. |
| 2,807,107 A | 9/1957 | Goulet |
| 2,956,518 A | 10/1960 | Sabol et al. |
| 3,090,425 A | 5/1963 | Carlo |
| 3,115,182 A | 12/1963 | Bobbitt |
| 3,146,824 A | 9/1964 | Veilleux |
| 3,314,468 A | 4/1967 | Reidel |
| 3,352,059 A | 11/1967 | Metz |
| 3,394,497 A | 7/1968 | Case |
| 3,581,798 A | 6/1971 | Malamed |
| 3,803,943 A | 4/1974 | Woloszyk |
| 3,855,733 A | 12/1974 | Miller |
| 3,886,851 A | 6/1975 | Berner |
| 4,051,336 A | 9/1977 | Miller |
| 4,122,629 A | 10/1978 | Rennick |
| 4,322,804 A | 3/1982 | Evans |
| 4,356,668 A | 11/1982 | Wagner |
| 4,519,164 A | 5/1985 | Porter |
| 4,658,543 A | 4/1987 | Carr |
| 4,750,295 A | 6/1988 | Court et al. |
| 4,772,875 A | 9/1988 | Maddox et al. |
| 4,782,628 A | 11/1988 | Gaddis |
| 4,796,385 A | 1/1989 | Tyler |
| 4,800,366 A | 1/1989 | Husmann |
| 4,844,567 A | 7/1989 | Chalabian |
| 4,849,735 A | 7/1989 | Kirtley et al. |
| 4,903,009 A | 2/1990 | D'Ambrosia et al. |
| 4,927,198 A | 5/1990 | Fennell et al. |
| 4,934,203 A | 6/1990 | Bailey et al. |
| 4,949,074 A | 8/1990 | D'Ambrosia et al. |
| 4,950,118 A | 8/1990 | Mueller et al. |
| 4,986,031 A | 1/1991 | Agnew et al. |
| 5,005,827 A | 4/1991 | Steinbrecher |
| 5,027,552 A | 7/1991 | Miller et al. |
| 5,029,819 A | 7/1991 | Kane |
| 5,050,846 A | 9/1991 | Goodman et al. |
| 5,078,197 A | 1/1992 | Weishar |
| 5,118,056 A | 6/1992 | Jeanise |
| 5,170,829 A | 12/1992 | Duncan et al. |
| 5,271,183 A | 12/1993 | Hahn et al. |
| 5,299,386 A | 4/1994 | Naegelli et al. |
| 5,353,859 A | 10/1994 | Oltahfer et al. |
| 5,459,963 A | 10/1995 | Alexander |
| 5,503,211 A | 4/1996 | Engi |
| 5,505,244 A | 4/1996 | Thumann |
| 5,564,238 A | 10/1996 | Ellis |
| 5,624,203 A | 4/1997 | Jackson et al. |
| 5,636,679 A | 6/1997 | Miller et al. |
| 5,649,396 A | 7/1997 | Carr |
| 5,660,144 A | 8/1997 | Venti |
| 5,690,317 A | 11/1997 | Sandsborg |
| 5,752,557 A | 5/1998 | Crider et al. |
| 5,823,705 A | 10/1998 | Jackson et al. |
| 5,875,597 A | 3/1999 | Gingrich et al. |
| 6,056,038 A | 5/2000 | Foster et al. |
| 6,186,274 B1 | 2/2001 | Reynolds et al. |
| 6,215,396 B1 | 4/2001 | Script |
| 6,244,324 B1 | 6/2001 | Quates et al. |
| 6,279,276 B1 | 8/2001 | Knoll |
| 6,288,651 B1 | 9/2001 | Souza |
| 6,356,502 B1 | 3/2002 | Yi |
| 6,375,164 B1 | 4/2002 | Siegler et al. |
| 6,375,165 B1 | 4/2002 | Sherratt et al. |
| 6,485,225 B1 | 11/2002 | Baker |
| 6,536,502 B2 | 3/2003 | Britto et al. |
| 6,542,078 B2 | 4/2003 | Script et al. |
| 6,561,137 B2 | 5/2003 | Oakman |
| 6,569,028 B1 | 5/2003 | Nichols et al. |
| 6,575,435 B1 | 6/2003 | Kotzen |
| 6,583,720 B1 | 6/2003 | Quigley |
| 6,595,496 B1 | 7/2003 | Langlie et al. |
| 6,634,139 B1 | 10/2003 | Metz |
| 6,688,480 B1 | 2/2004 | Denny |
| 6,715,973 B2 | 4/2004 | Faber et al. |
| 6,733,204 B1 | 5/2004 | Paniccia |
| 6,776,398 B1 | 8/2004 | Tsai |
| 6,779,581 B2 | 8/2004 | Towley |
| 6,807,999 B1 | 10/2004 | Bowen et al. |
| 6,830,236 B2 | 12/2004 | Augusto de Lorenzo |
| 6,940,405 B2 | 9/2005 | Script et al. |
| 6,980,117 B1 | 12/2005 | Kirkland et al. |
| 7,034,682 B2 | 4/2006 | Beggs et al. |
| 7,045,764 B2 | 5/2006 | Beggs et al. |
| 7,141,450 B2 | 11/2006 | Pardo |
| 7,380,375 B2 | 6/2008 | Maly |
| 2002/0170688 A1 | 11/2002 | Daus et al. |
| 2002/0190849 A1 | 12/2002 | Orzechowski |
| 2003/0016996 A1 | 1/2003 | Gelfand et al. |
| 2003/0079845 A1 | 5/2003 | Stern, Jr. |
| 2003/0111657 A1 | 6/2003 | Green |
| 2004/0075046 A1 | 4/2004 | Beggs et al. |
| 2005/0102041 A1* | 5/2005 | Duvernell et al. ............... 700/17 |
| 2005/0168999 A1* | 8/2005 | Sommers et al. ............. 362/427 |
| 2005/0196255 A1 | 9/2005 | Sveum et al. |
| 2005/0198750 A1* | 9/2005 | Spencer et al. ................ 14/71.5 |
| 2006/0137261 A1 | 6/2006 | Maly |
| 2008/0127435 A1 | 6/2008 | Maly et al. |

OTHER PUBLICATIONS

United States Patent and Trademark Office, "Final Office Action," issued in connection with U.S. Appl. No. 11/945,075, issued Sep. 3, 2010, 41 pages.

European Patent Office, "Notice of Intention to Grant," issued in connection with European application serial No. 08 853 556.2, issued Feb. 2, 2012, 6 pages.

Gaylord Material Handling "Dock Strap," retrieved from www.callgaylord.com, May 14, 2002, 1 page.

Engination, "Engineering and Imagination from Concept to Rollout," Rite-Hite Aftermarket Meeting, Jul. 9, 2003, 8 pages.

European Patent Office, "Extended European Search Report," issued in connection with European application serial No. 05854216.8, issued Jan. 27, 2009, 8 pages.

International Bureau, "International Preliminary Report on Patentability," issued in connection with international application serial No. PCT/US2005/045451, issued Jun. 19, 2007, 4 pages.

International Searching Authority, "International Search Report," issued in connection with international application serial No. PCT/US2005/09600, mailed Jul. 11, 2006, 2 pages.

International Searching Authority, "Written Opinion the International Searching Authority," issued in connection with international application serial No. PCT/US2005/09600, mailed Jul. 11, 2006, 3 pages.

International Searching Authority, "International Search Report," issued in connection with international application serial No. PCT/US2005/45451, mailed Oct. 31, 2006, 3 pages.

International Searching Authority, "Written Opinion of the International Searching Authority," issued in connection with international application serial No. PCT/US2005/45451, mailed Oct. 31, 2006, 4 pages.

Untied States Patent and Trademark Office, "Supplemental Notice of Allowance," issued in connection with U.S. Appl. No. 11/011/721, mailed Mar. 25, 2008, 4 pages.

(56) References Cited

OTHER PUBLICATIONS

United States Patent and Trademark Office, "Notice of Allowance," issued in connection with U.S. Appl. No. 11/011,721, mailed Feb. 1, 2008, 10 pages.

United States Patent and Trademark Office, "Non-Final Office Action," issued in connection with U.S. Appl. No. 11/011,721, mailed Apr. 19, 2007, 15 pages.

United States Patent and Trademark Office, "Non-Final Office Action," issued in connection with U.S. Appl. No. 11/011,721, mailed Sep. 26, 2006, 8 pages.

Patent Office of the Peoples Republic of China, "First Office Action," with English translation, issued in connection with Chinese application serial No. 200580042627.2, issued Aug. 8, 2008, 11 pages.

European Patent Office, "Office Action," issued in connection with European application serial No. 05854216.8, issued May 8, 2009, 5 pages.

International Searching Authority, "International Search Report," issued in connection with international application serial No. PCT/US2008/084398, mailed Feb. 12, 2009, 4 pages.

International Searching Authority, "Written Opinion of the International Searching Authority," issued in connection with international application serial No. PCT/US2008084398, mailed Feb. 12, 2009, 8 pages.

United States Patent and Trademark Office, "Non-Final Office Action," issued in connection with U.S. Appl. No. 11/945,075, mailed Dec. 28, 2009, 34 pages.

Patent Office of the Peoples Republic of China, "Second Office Action," issued in connection with Chinese application serial No. 200580042627.2, issued Jul. 31, 2009, 6 pages.

Australian Patent Office, "Examination Report," issued in connection with Australian application serial No. 2008329855, issued May 20, 2011, 2 pages.

International Bureau, "International Preliminary Report on Patentability," issued in connection with international application serial No. PCT/US2008/084398, issued Jun. 1, 2010, 9 pages.

United States Patent and Trademark Office, "Non-Final Office Action," issued in connection with U.S. Appl. No. 11/945,075, mailed Jul. 27, 2012, 37 pages.

Canadian Intellectual Property Office, "Office Action," issued in connection with international application serial No. 2,705,359, issued Sep. 21, 2011, 3 pages.

Canadian Intellectual Property Office, "Office Action," issued in connection with Canadian application serial No. 2,705,359, issued Jan. 3, 2013, 3 pages.

United States Patent and Trademark Office, "Final Office Action," issued in connection with U.S. Appl. No. 11/945,075, mailed Feb. 25, 2013, 30 pages.

Supplemental Notice of Allowability, issued by the United States Patent Trademark Office in connection with U.S. Appl. No. 11/945,075, on Aug. 29, 2013, 36 pages.

\* cited by examiner

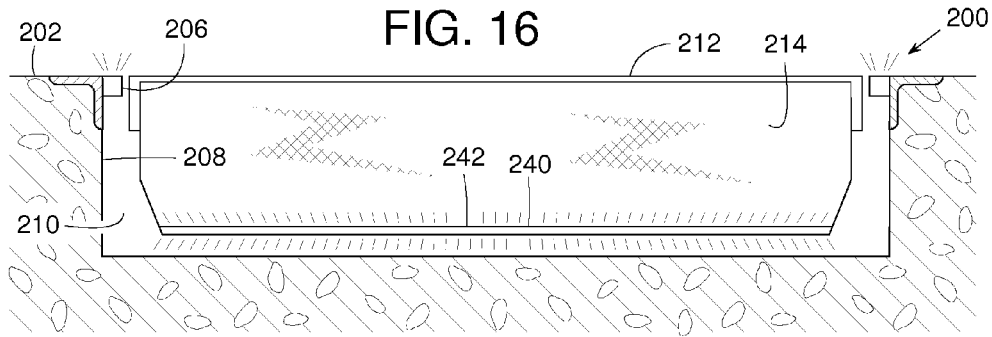
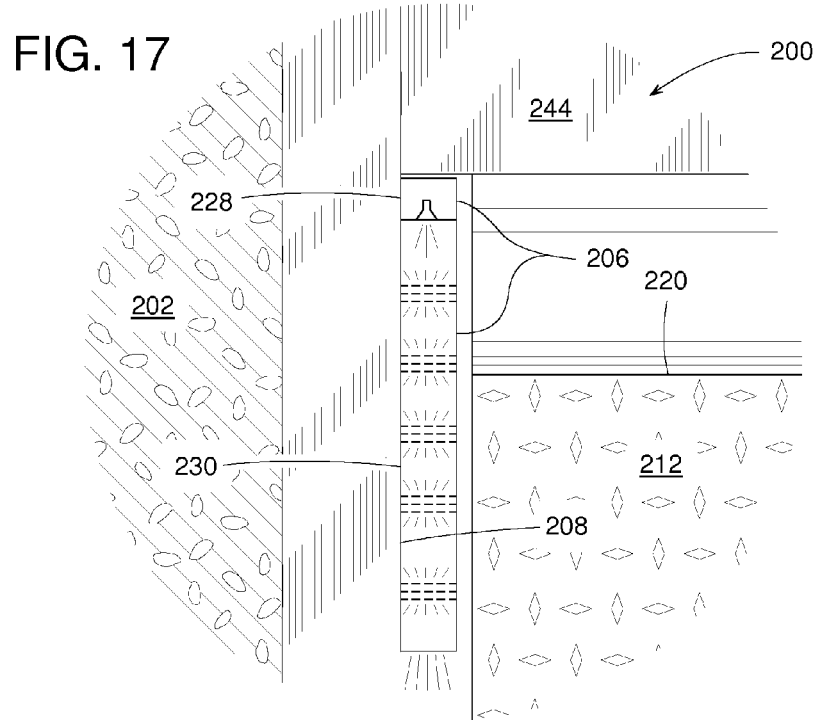
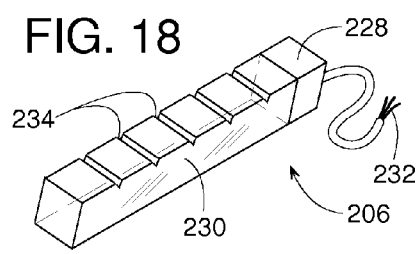
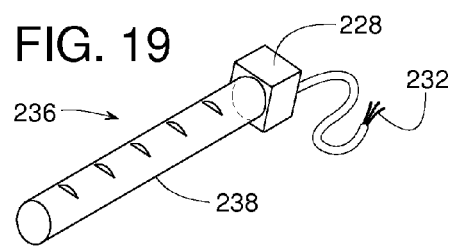

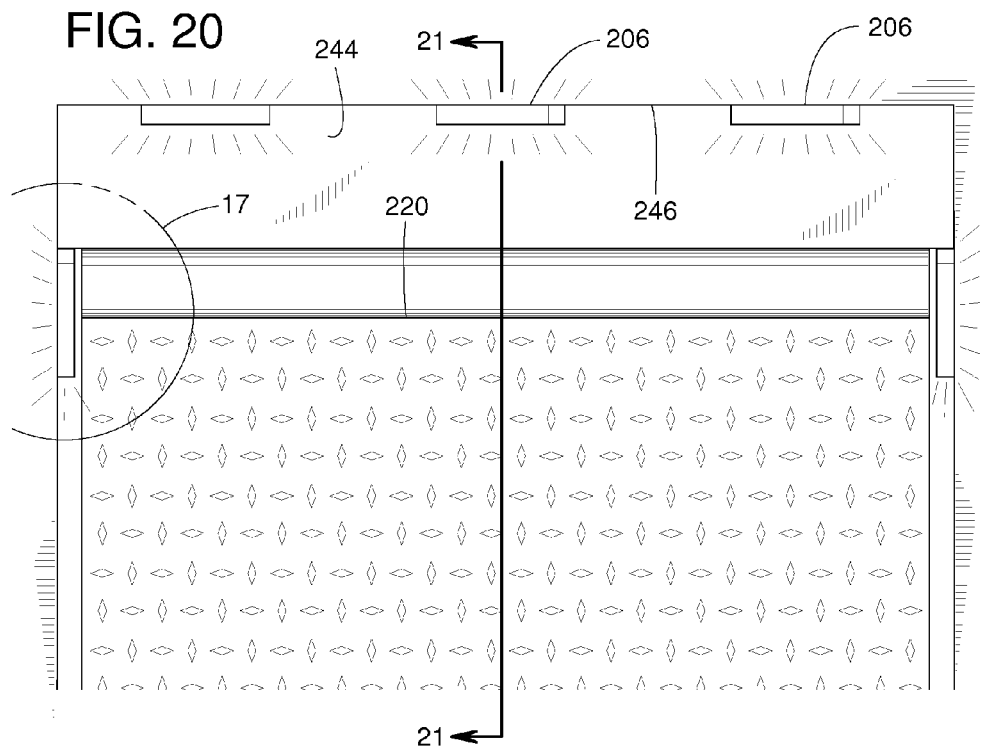
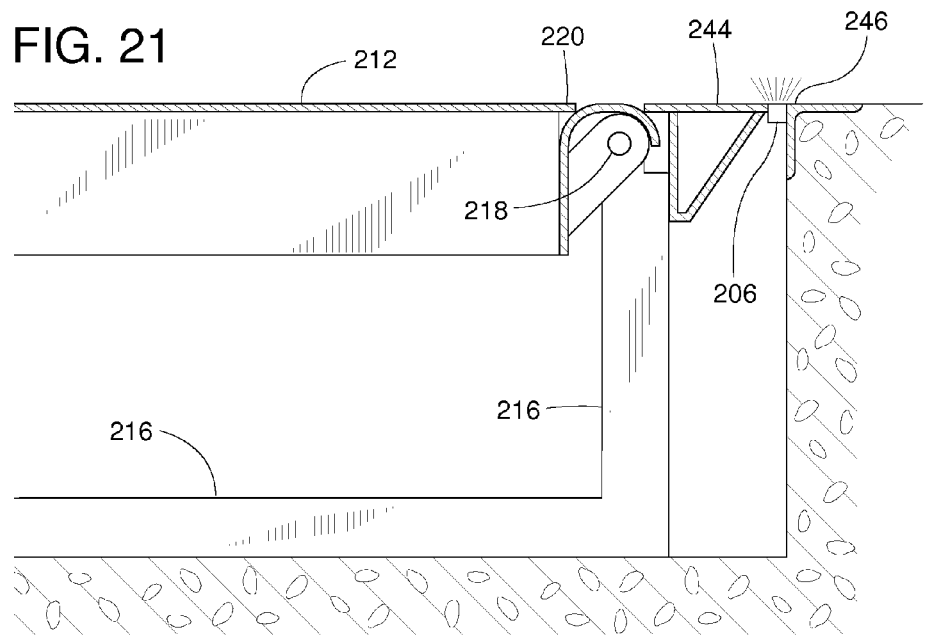

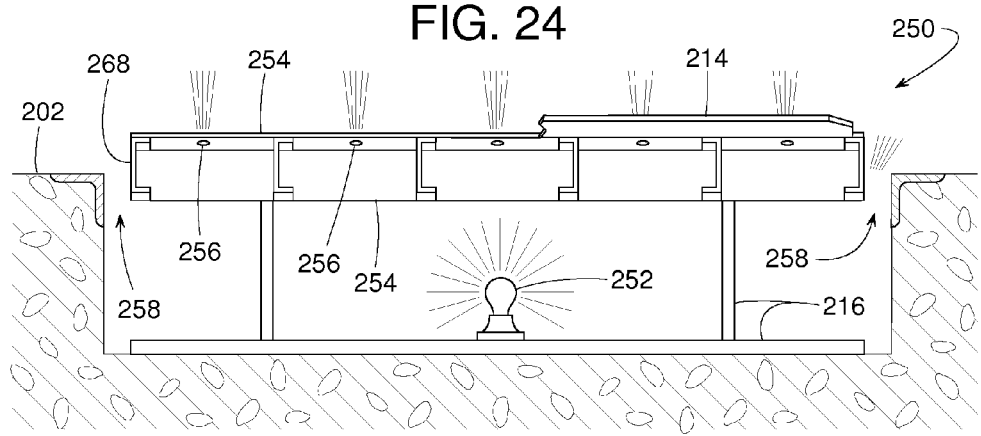
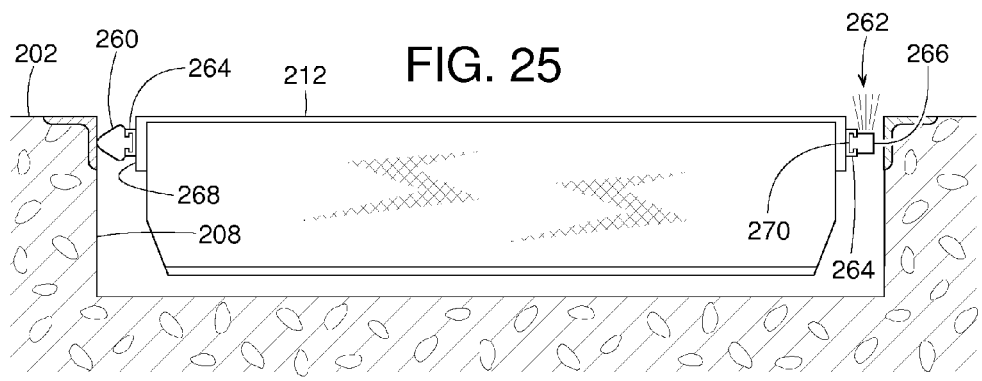
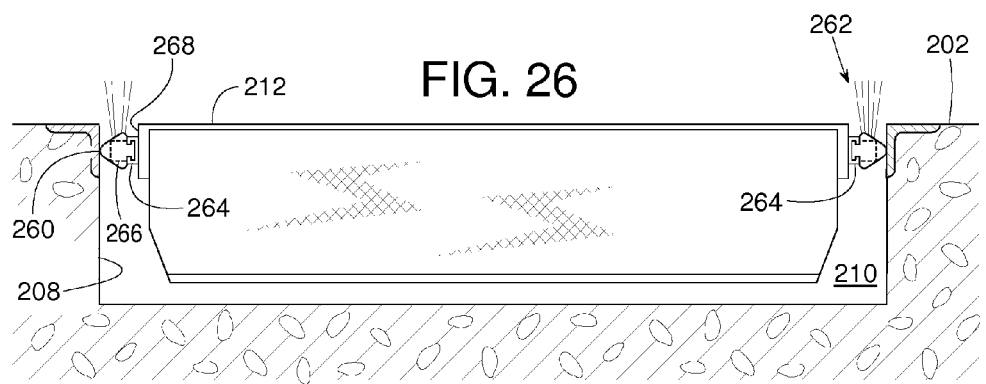

LIGHTING AND SIGNALING SYSTEMS FOR LOADING DOCKS

CROSS REFERENCE TO RELATED APPLICATION

This patent is a continuation-in-part of U.S. patent application Ser. No. 11/945,075 entitled "Alarm System for a Loading Dock," filed Nov. 26, 2007 and currently pending, which is a continuation-in-part of U.S. Pat. No. 7,380,375 entitled "Alarm System for a Loading Dock," filed Dec. 14, 2004 and issued on Jun. 3, 2008, both of which are incorporated herein by reference in their entirety.

FIELD OF THE DISCLOSURE

This patent generally pertains to truck loading docks and more particularly to lighting and signaling systems for loading docks.

BACKGROUND

Many buildings may have a doorway with a loading dock to facilitate transferring cargo between a truck and the building. A loading dock is a platform that is generally at the same elevation as the bed of the truck or its trailer. The dock may also include a dock leveler, which is a vertically movable ramp that compensates for a height differential that may exist between the platform and the truck bed. Dock levelers may also provide a bridge across which personnel and material handling equipment can travel between the platform and the truck.

For protection against weather and theft, the doorway of the building may include a manual or power operated door. Doors for loading docks usually open and close by moving vertically so as not to interfere with the rear of the truck or interfere with cargo and activity just inside the doorway; however, other types of doors can be used.

When there is no truck at the dock and the weather is mild, the door may be left open to help ventilate the building with fresh outside air. Leaving the door open, unfortunately, increases the risk of personnel or material handling or other equipment inside the building from accidentally falling off the edge of the dock's platform and through the open doorway to the driveway. In addition, the door being left open decreases building security due to entrance of unauthorized personnel or employee theft via the unsecured doorway.

To provide ventilation through the doorway while minimizing the falling hazard, some loading docks include a runoff barrier that provides an obstruction across the doorway when a truck is not present or otherwise moves to a nonblocking position as needed. Examples of such barriers are described in U.S. Pat. Nos. 5,271,183 and 5,299,386.

Regardless of whether a loading dock includes a runoff barrier, a forklift transferring cargo between the truck's trailer and the dock's platform can present a collision hazard for dockworkers or other people in the work area. If a forklift is operating deep inside the truck's trailer, the forklift driver and nearby pedestrians might not notice each other. Thus, the forklift might suddenly emerge from within the trailer and accidentally strike someone.

BRIEF DESCRIPTION OF THE DRAWINGS

FIG. 16 illustrates a front view of the example dock system of FIGS. 14 and 15.

FIG. 17 illustrates a partial view of the example dock system of FIGS. 14-16.

FIG. 18 illustrates the example light apparatus described herein.

FIG. 19 illustrates another example light apparatus described herein.

FIG. 20 illustrates the example light system of FIGS. 14-17 but implemented on the dock system at a different location than as shown in FIGS. 14-17.

FIG. 21 is a cross-sectional view of the light system and dock system of FIG. 20 taken along line 21-21.

FIG. 24 illustrates yet another example light system described herein that can be used to implement a dock system.

FIG. 25 illustrates yet another example light system described herein that can be used to implement a dock system.

FIG. 26 illustrates yet another example light system described herein that can be used to implement a dock system.

DETAILED DESCRIPTION

Figure 1:
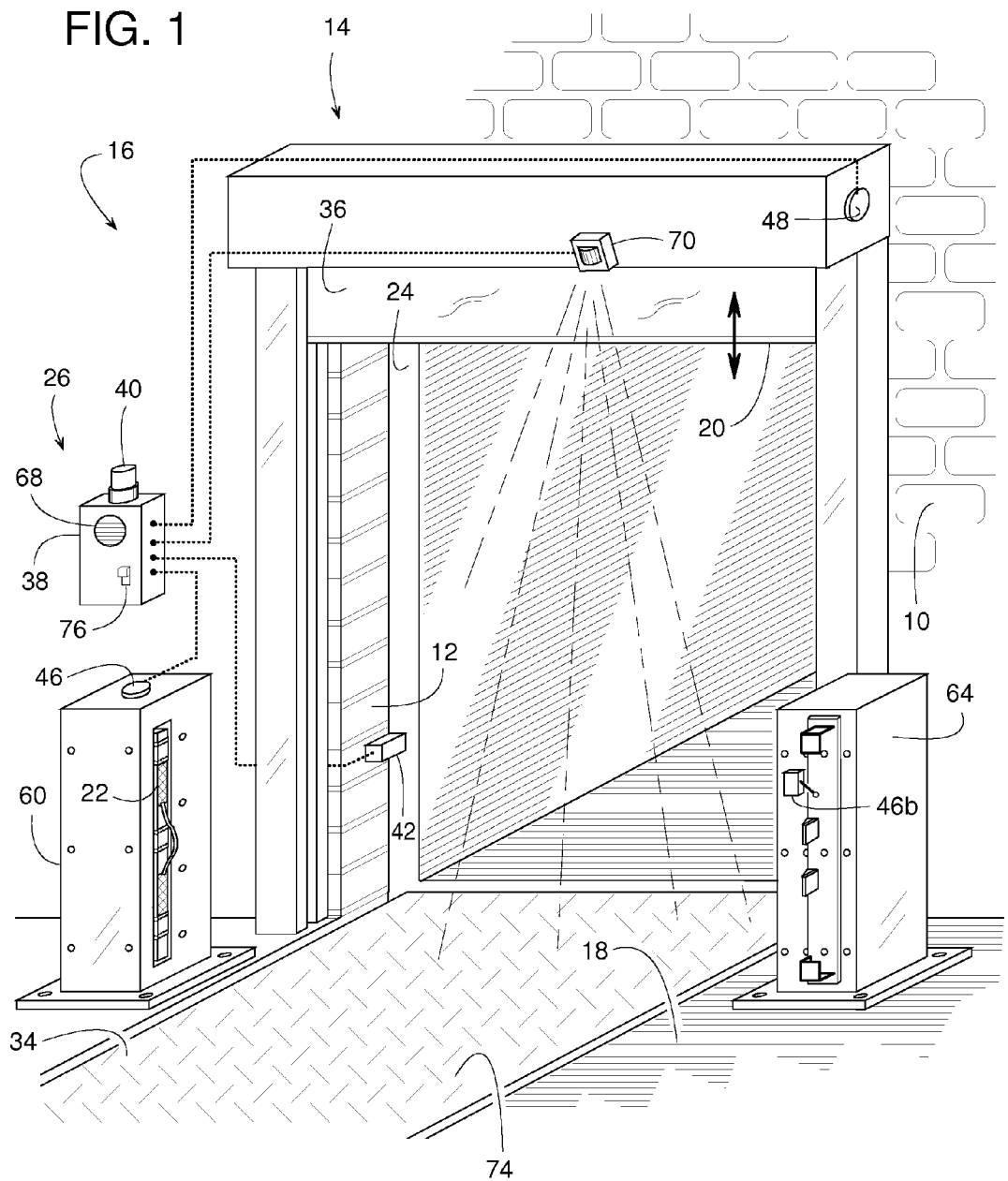
FIG. 1 is a perspective view of a safety system, wherein the view is from inside a building looking at a loading dock whose door and barrier are open while a truck is present at the dock.
Figure 2:
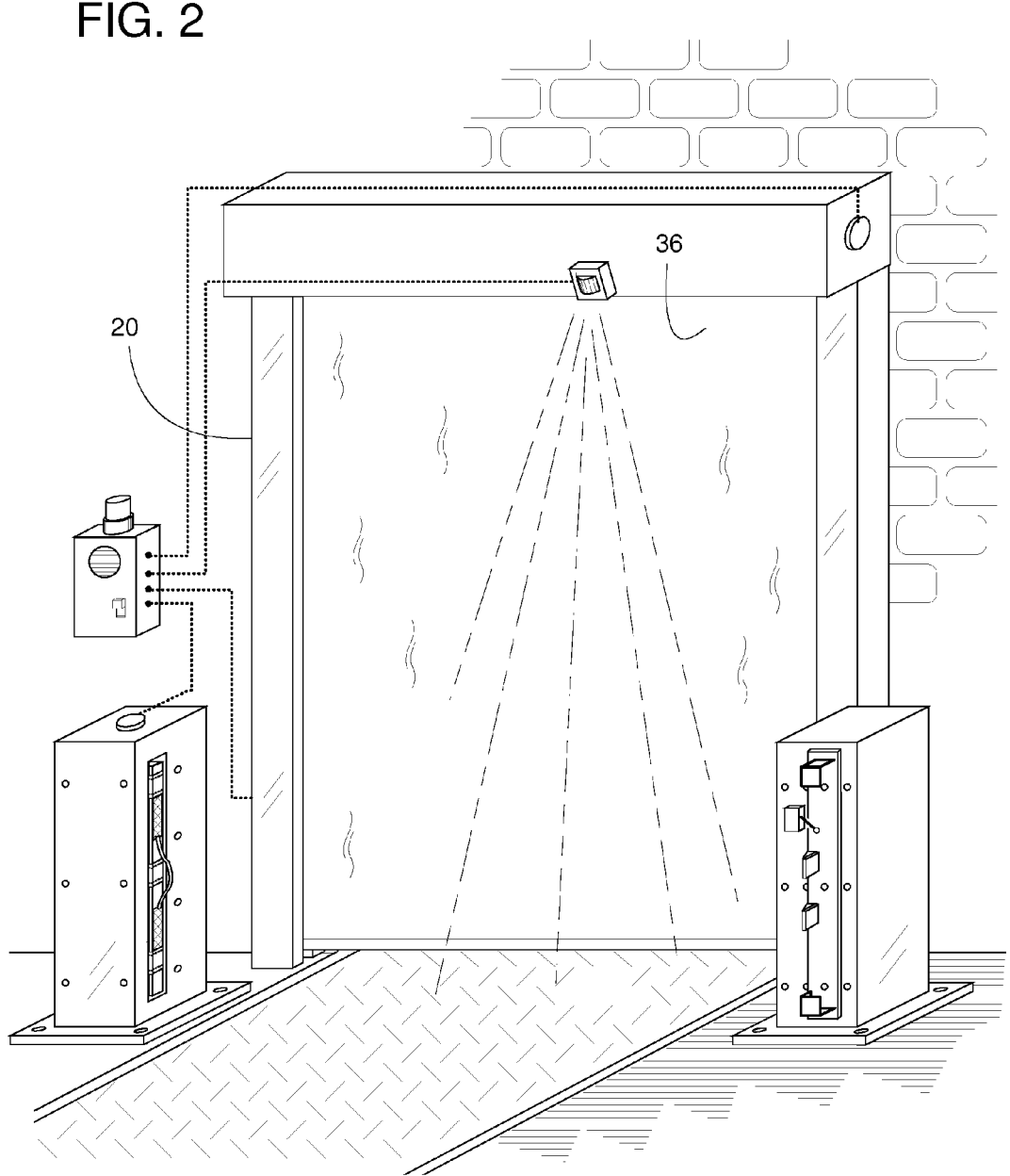
FIG. 2 is similar to FIG. 1 but showing the door closed.
Figure 3:
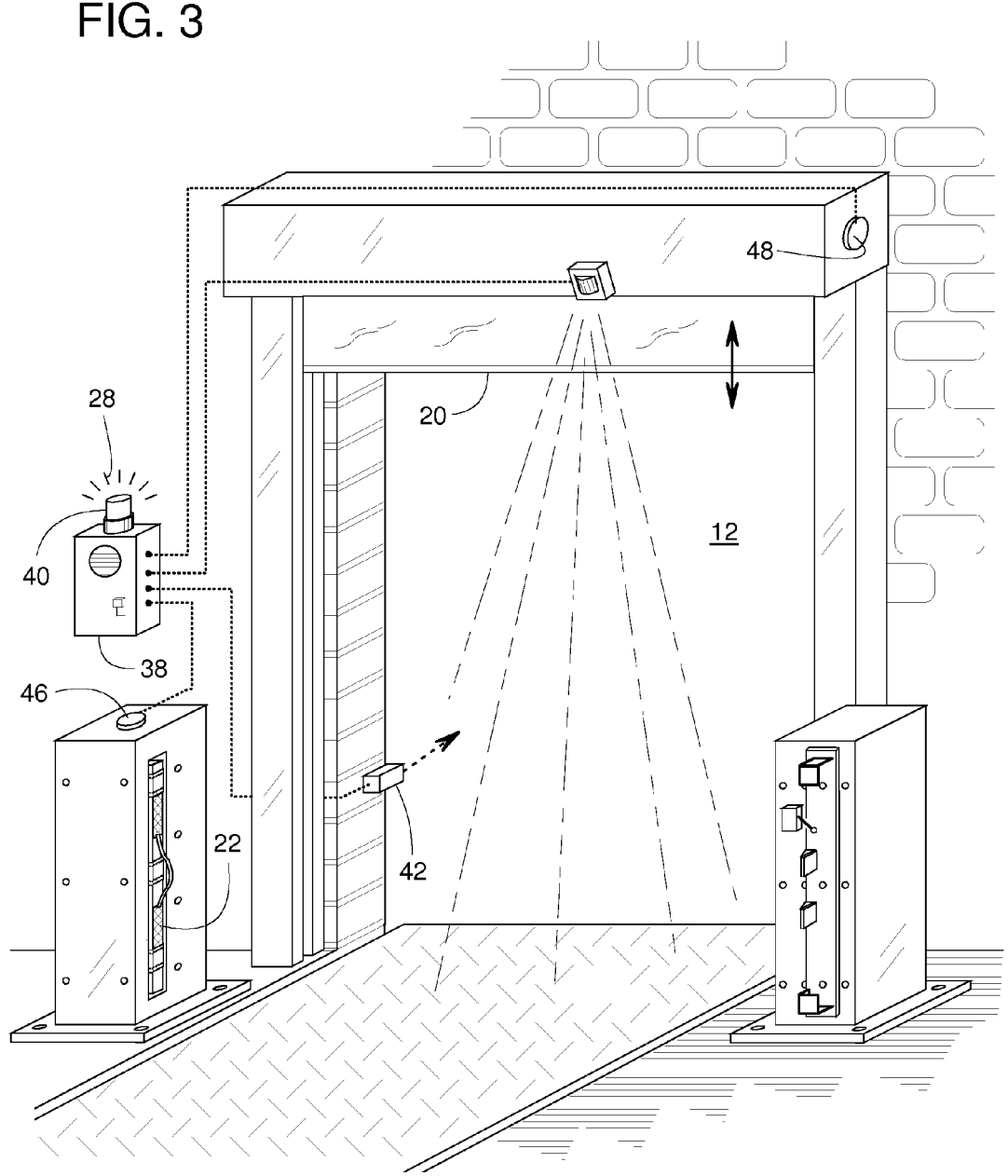
FIG. 3 is similar to FIG. 1 but without the truck at the dock, so the safety system provides an alarm signal (e.g., a light).

FIGS. 1-6 provide an inside view of a building 10 with a doorway 12 and a loading dock 14, wherein the loading dock is shown in various situations. Under certain conditions, a safety system 16 provides one or more alarm signals that warn of a potential falling hazard where someone or something could possibly fall off a raised platform 18 of dock 14. If a door 20 and a barrier 22, for instance, were left open while a truck 24 or other type of vehicle was not present at the dock, as shown in FIG. 3, an alarm system 26 (e.g., an alarm driven by a controller) could provide an audible or visual alarm signal 28 that could alert dockworkers in the area of the hazard. In some examples system 26 may also provide a more pronounced audible or visual warning signal 30 (FIG. 6) to signify more imminent danger, such a body 32 (e.g., a person, a forklift, etc.) being dangerously close to the exposed edge of platform 18.

The safety function can be achieved in numerous ways, so it should be appreciated that the example of FIGS. 1-6 is just an illustrative example of a safety system described herein The response of safety system 16 (i.e., alarm system 26 plus its sensors) depends on the situation that happens to exist at the dock.

FIG. 1, for example, shows door 20 being open while truck 24 is backed up against the dock. In this situation there may be no need for an alarm because truck 24 being present at the dock minimizes or eliminates the possibility of something falling off platform 18 and onto the driveway or falling off a conventional dock leveler 34 installed within the platform.

FIG. 2 shows door 20 closed where a door panel 36 covers doorway 12. With door 20 closed, an alarm may not be needed, unless there is still a concern for something breaking through the door.

FIG. 3 shows no truck present at the dock while door 20 is open. Since this presents a potential falling hazard, a controller 38 may be wired or programmed to energize an alarm 40 to produce an alarm signal 28 such as, for example, a red flashing light. Controller 38 may energize alarm 40 in response to a vehicle sensor 42 determining that truck 24 is not within a certain distance 44 of doorway 12 (see FIG. 9) and a barrier sensor 48 determining that door 20 is not closed. Sensor 48 is referred to as a "barrier sensor" because door 20 may be considered a barrier itself. In some examples, barrier 22 is omitted, and door panel 36 alone (or in combination with added structure) serves as a runoff barrier.

Barrier sensor 48 for door 20 is schematically illustrated to represent any device for detecting a particular position of door panel 36. With further reference to FIG. 7, examples of barrier sensor 48 include, but are not limited to, an upper travel limit switch 48a, a lower travel limit switch 48b, a rotational switch (FIGS. 1-6), electromechanical switch, electromagnetic sensor, ultrasonic proximity sensor, limit switch, proximity switch, photoelectric eye, Hall Effect sensor, magnetic switch, etc.

Vehicle sensor 42 is schematically illustrated to represent any device for detecting that vehicle 24 is adjacent to or within certain distance 44 of doorway 12.

Examples of vehicle sensor 42 include, but are not limited to, a rotational switch, electromechanical switch, a treadle switch 42a actuated by a truck tire 50 (FIG. 7), a switch 42b actuated by movement of a dock seal/shelter 52, a switch 42c actuated by movement of a vehicle restraint 54, a switch 42d actuated by movement of a bumper 56, a switch 42e actuated by movement of dock leveler 34, electromagnetic sensor, an ultrasonic proximity sensor 42f, limit switch, proximity switch, photoelectric eye, Hall Effect sensor, magnetic switch, etc.

In an alternate embodiment, controller 38 may be wired or programmed to energize alarm 40 when vehicle sensor 42 determines that a truck is not present at the dock while a barrier sensor 46 establishes that barrier 22 is in a nonblocking position. Barrier sensor 46 is schematically illustrated to represent any device for detecting a particular position of barrier 22. Again with further reference to FIG. 7, examples of barrier sensor 46 include, but are not limited to, a travel limit switch 46a, a rotational switch on a take-up drum (FIGS. 1-6), electromechanical switch, electromagnetic sensor, ultrasonic proximity sensor, proximity switch, photoelectric eye, Hall Effect sensor, magnetic switch, etc. Barrier sensor 46 can be installed on a first stanchion 60 supporting barrier 22, or a barrier sensor 46b could be installed on a second stanchion 64 of barrier 22.

In yet another alternative, controller 38 may be wired or programmed to energize alarm 40 in response to vehicle sensor 42 determining that truck 24 is not present or within a certain distance 44 of doorway 12 (see FIG. 9) and barrier sensor 48 determining that door 20 is not closed. Moreover, it should be appreciated that the depicted location of sensor 42 is for descriptive purposes only, and other locations for sensor 42 such as mounting it externally to the building adjacent the dock may be preferred.

Figure 4:
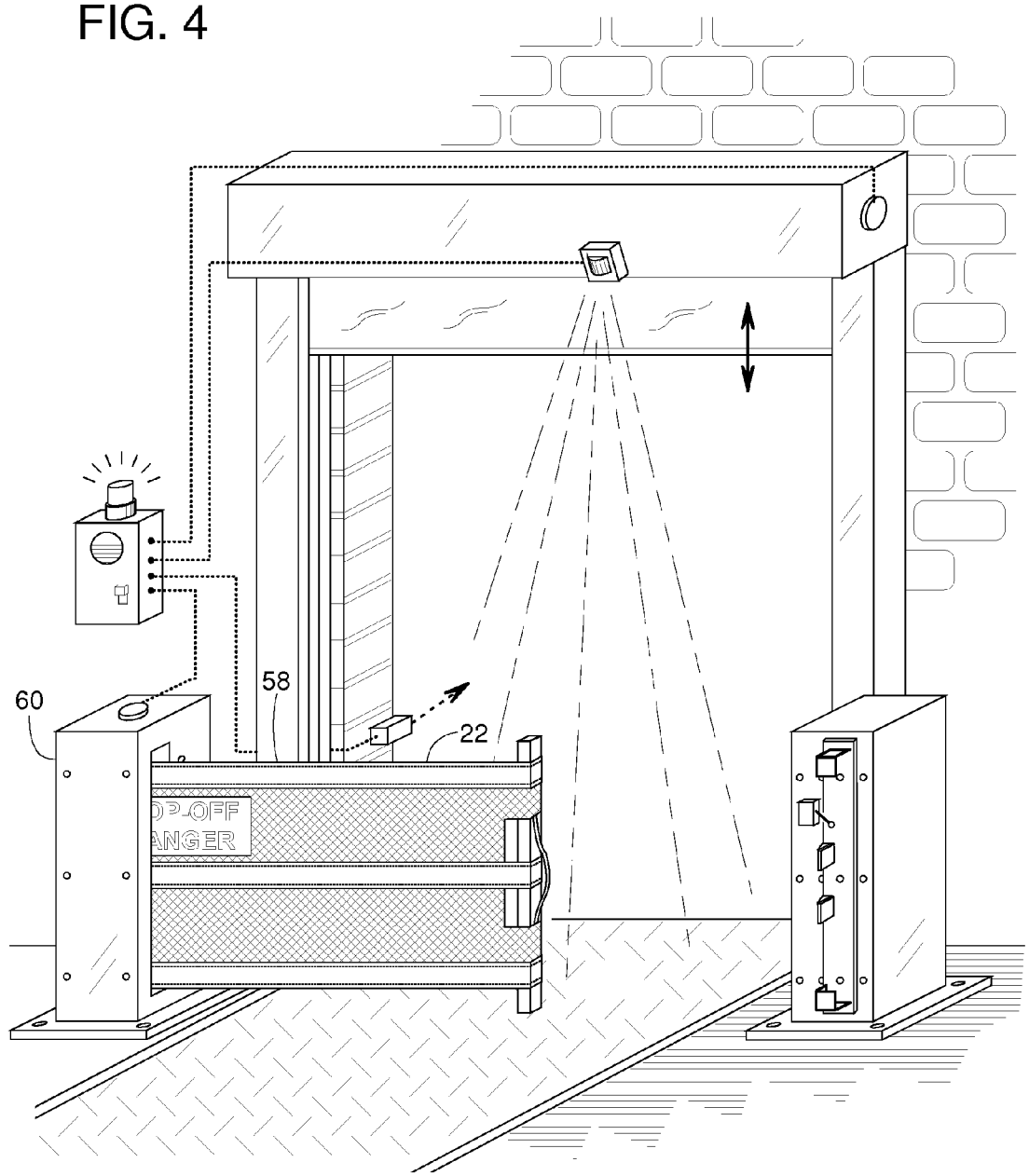
FIG. 4 is similar to FIG. 3 but showing the barrier being closed.
Figure 5:
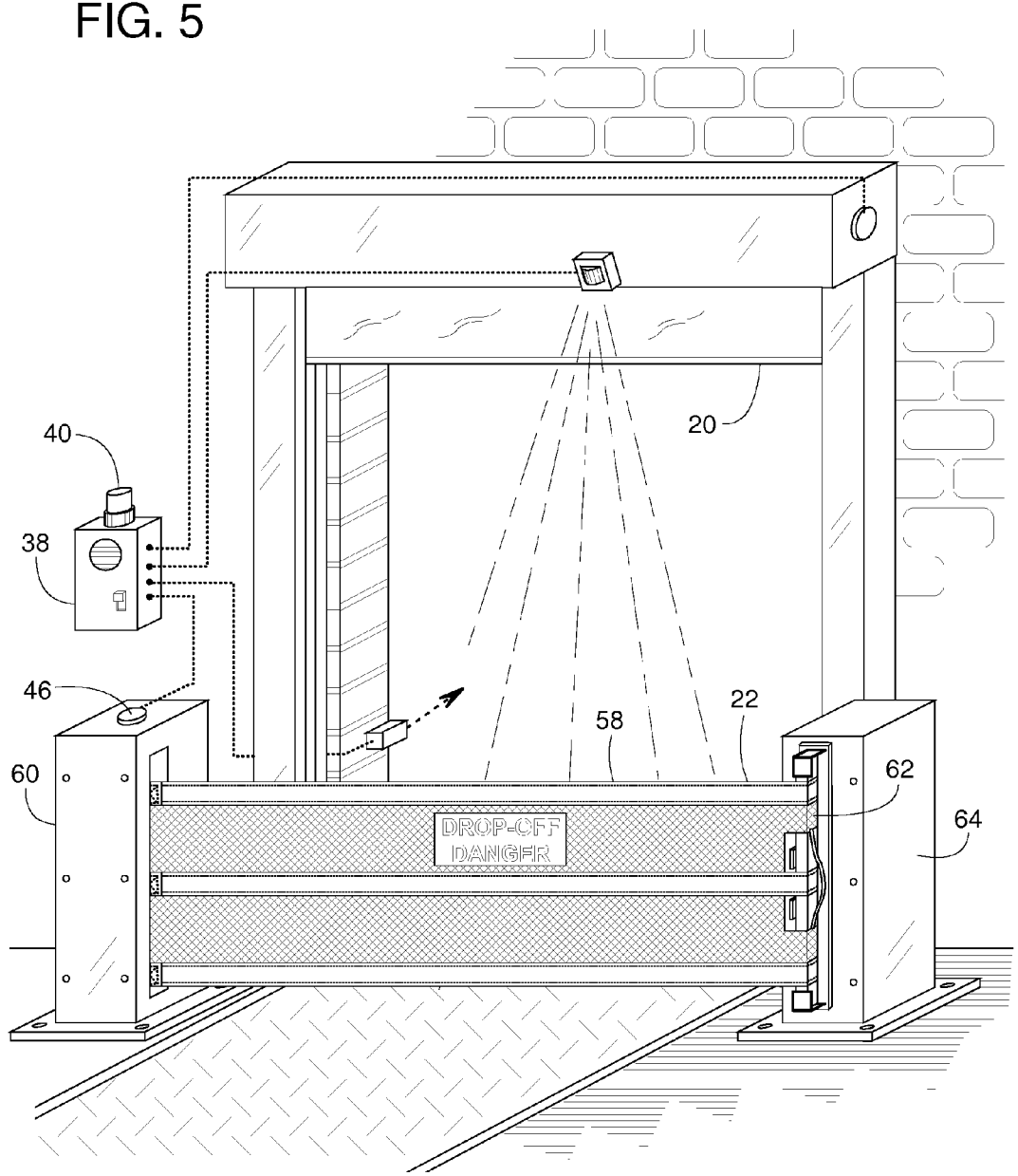
FIG. 5 is similar to FIG. 4 but showing the barrier closed.

FIG. 4 shows barrier 22 being moved from its nonblocking position of FIG. 3 to its blocking position of FIG. 5. In the blocking position, barrier 22 obstructs the open doorway to help prevent something from falling through it. Although many different types of barriers would work, in this particular example barrier 22 is a tough fabric panel 58 that can be moved between blocking and nonblocking positions. In the nonblocking position of FIG. 3, panel 58 wraps about a spring-loaded, rotatable drum supported within first stanchion 60. In the blocking position of FIG. 5, one end 62 of panel 58 hooks onto second stanchion 64 so that panel 58 provides a taut protective fence between stanchions 60 and 64.

In FIG. 5, controller 38 de-energizes alarm 40 in response to barrier sensor 46 determining that barrier 58 is in its blocking position where the barrier minimizes or eliminates the falling hazard.

Figure 6:
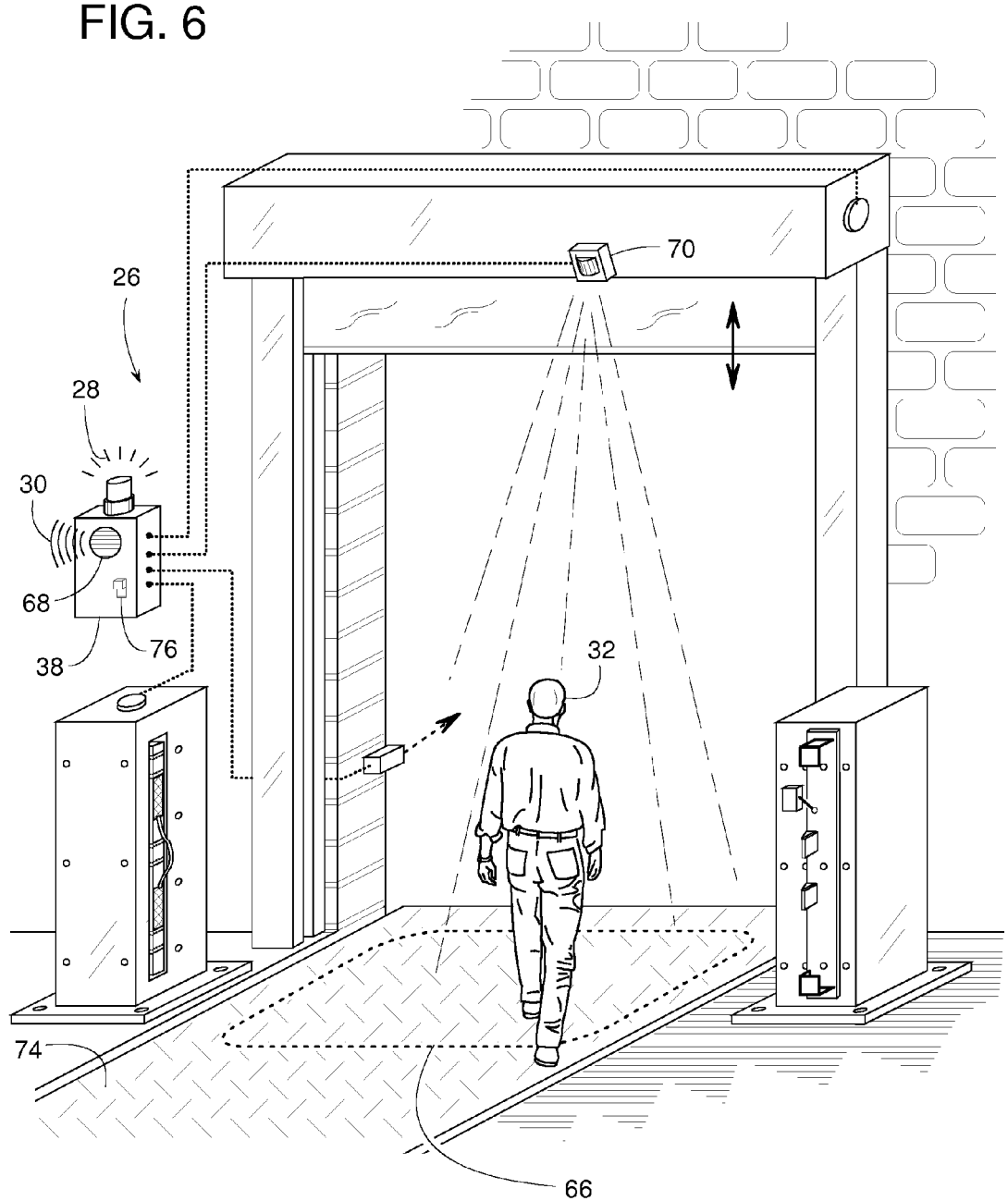
FIG. 6 is similar to FIG. 3 but with a person within a predetermined distance of the edge of the platform, so the safety system provides a more pronounced warning signal (e.g., a buzzer).
Figure 7:
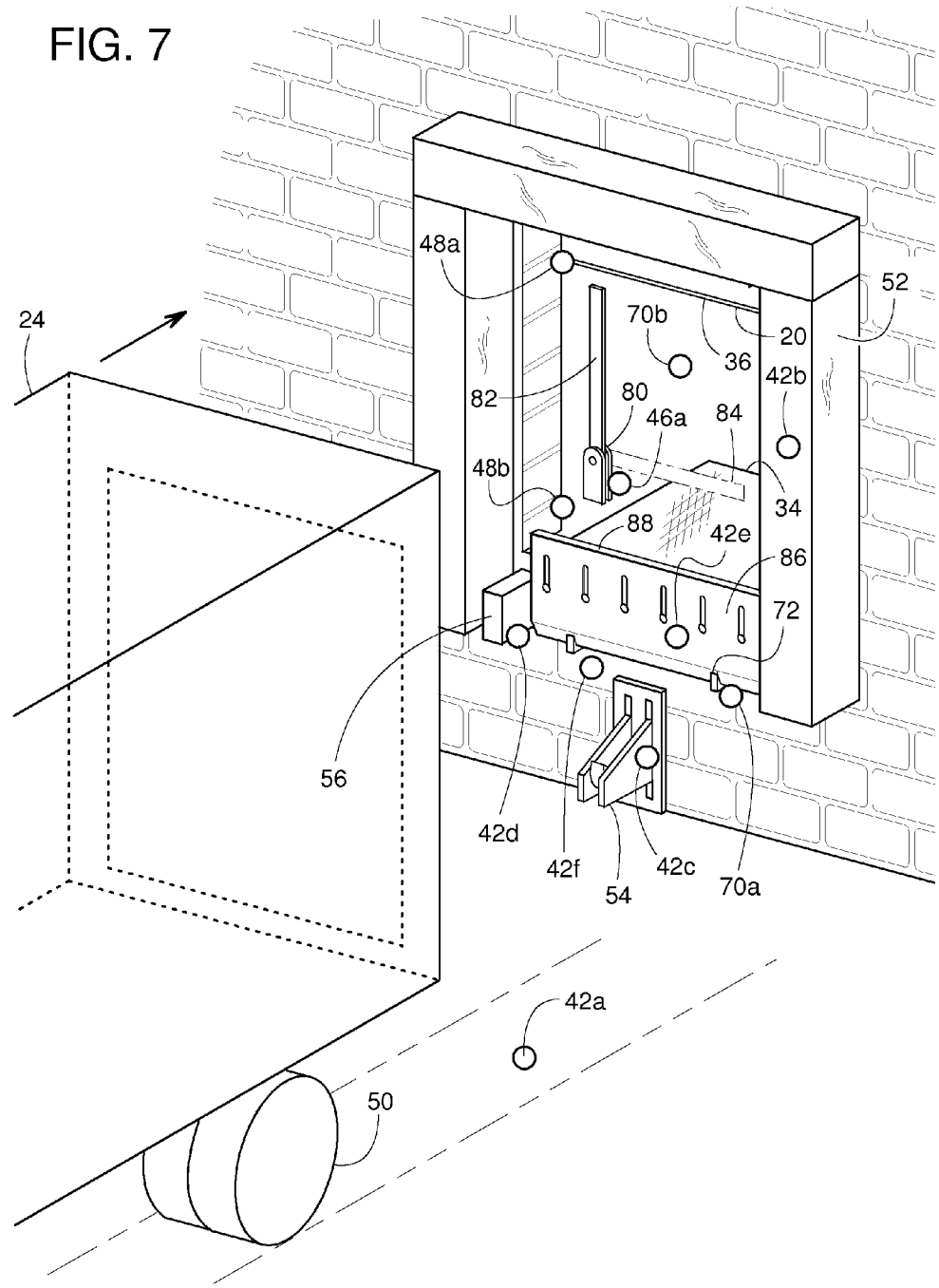
FIG. 7 is a perspective view of a safety system, wherein the view is taken from outside the building, and the drawing schematically shows numerous sensors installed at various locations.

FIG. 6 shows how safety system 26 could be configured to respond when the falling hazard poses more imminent danger, such as when body 32 approaches the open doorway. To achieve this functionality, when body 32 comes within an area 66 adjacent to the doorway 12 when door 20 is open, no truck is present, and barrier 22 is in its unobstructed position, controller 38 energizes an alarm 68 to create warning signal 30 that is audible or otherwise distinguishable from alarm signal 28. Controller 38 energizes alarm 68 in response to a remote body sensor 70, which is schematically illustrated to represent any device for determining whether body 32 is within area 66 (i.e., within a certain distance of the doorway). Examples of remote body sensor 70 include, but are not limited to a metal detector, motion detector, a weight detector 70a associated with dock leveler 34 (e.g., attached to a lip keeper 72) for sensing when the weight of a body is on the dock leveler's deck 74, infrared sensor, photoelectric eye that determines whether a body crosses its beam or line of sight, ultrasonic proximity sensor, electromagnetic radiation antenna, etc. Although FIGS. 1-6 show remote body sensor 70 installed in an overhead location, FIG. 7 indicates that a remote body sensor 70b can be installed at any location that would be appropriate for a particular type of sensor.

In some cases, controller 38 may include a disable switch 76 for disabling alarm 68 under certain conditions such as, for instance, when the door or other equipment in the area needs servicing. If the alarm system, for example, includes both a visual signal and an audible signal, switch 76 can be configured to silence the audible signal but still permit the actuation of the visual signal.

Figure 8:
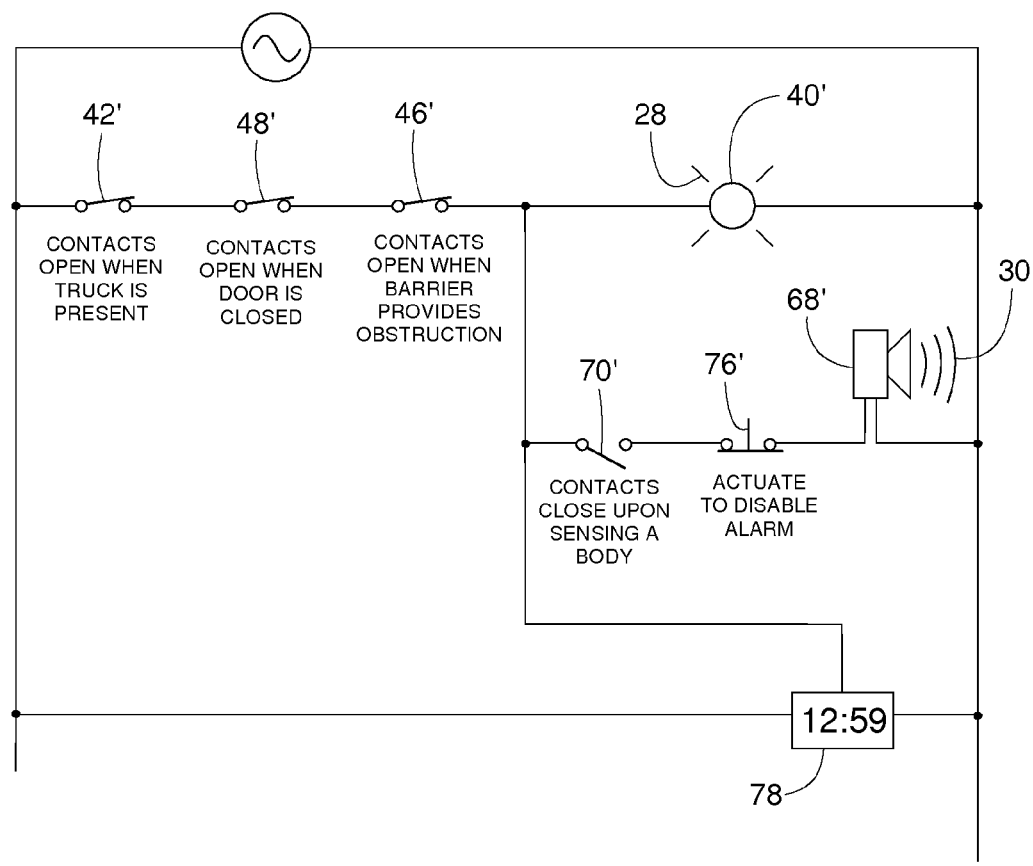
FIG. 8 is ladder diagram illustrating just one of many conceivable ways for controlling the safety system of FIG. 1.

FIG. 8 shows just one example of many possible control schemes that could achieve the results just described. The various elements of FIG. 8 are schematic symbols or representations of what could correspond to vehicle sensor 42, barrier sensor 48, barrier sensor 46, body sensor 70, disable switch 76, alarm 40, and alarm 68, wherein 42' corresponds to 42, 48' corresponds to 48, etc. In FIG. 8, the various sensors or switches are shown in their "normal" positions when truck 24 in not present (normally closed contacts of sensor 42' are closed), door 20 is open (normally closed contacts of sensor 48' are closed), barrier 22 is in its nonblocking position (normally closed contacts of sensor 46' are closed), body 32 is not within an area 66 (normally open contacts of sensor 70' are open), and disable switch 76' is in its normally closed position. Controller 38 energizes visual alarm 40' until at least one of the following occurs: the arrival of truck 24 opens the contacts of vehicle sensor 42', door 20 closes to open the contacts of barrier sensor 48', or barrier 22 closes to open the contacts of barrier sensor 46'. In cases where the barrier is provided by the door itself, barrier sensor 46' is omitted (or short circuited). If in addition to visual alarm 40' being energized, body 32 enters an area 66 to close the contacts of remote body sensor 70', controller 38 also energizes audible alarm 68'. A clock 78 may be added to establish a timestamp that identifies when alarm 68' (and/or alarm 40') was activated, which can be useful for investigating an accident.

Figure 9:
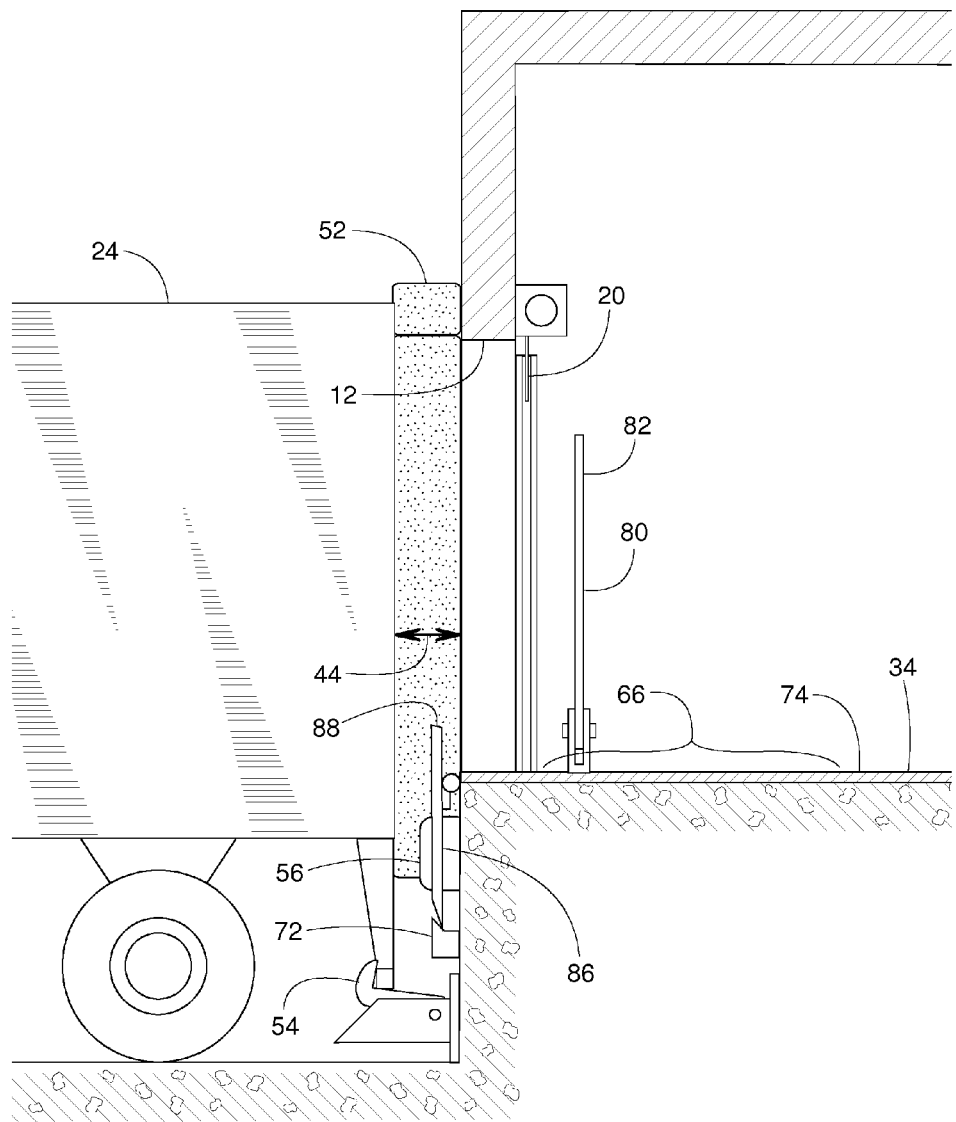
FIG. 9 is a cross-sectional side view of a loading dock similar to FIG. 1 but with a pivotal barrier and a vehicle restraint engaging a truck.

FIGS. 7 and 9 show another example of a barrier 80, wherein barrier 80 includes an arm 82 that pivots between a blocking position (phantom line 84 in FIG. 7) and a nonblocking position (solid lines in FIGS. 7 and 9). FIGS. 7 and 9 also show dock leveler 34 having a lip 86 whose upper edge 88 can be used as a barrier for preventing accidental runoff, particularly for material handling equipment. An example of such a dock leveler is described in U.S. Pat. No. 4,920,598, which is specifically incorporated by reference herein. If either of these barriers were used in a safety system as disclosed herein, there would be an associated sensor or sensing scheme (e.g., sensor 46a of FIG. 7) to determine whether the barrier is or is not in a blocking position.

Figure 10:
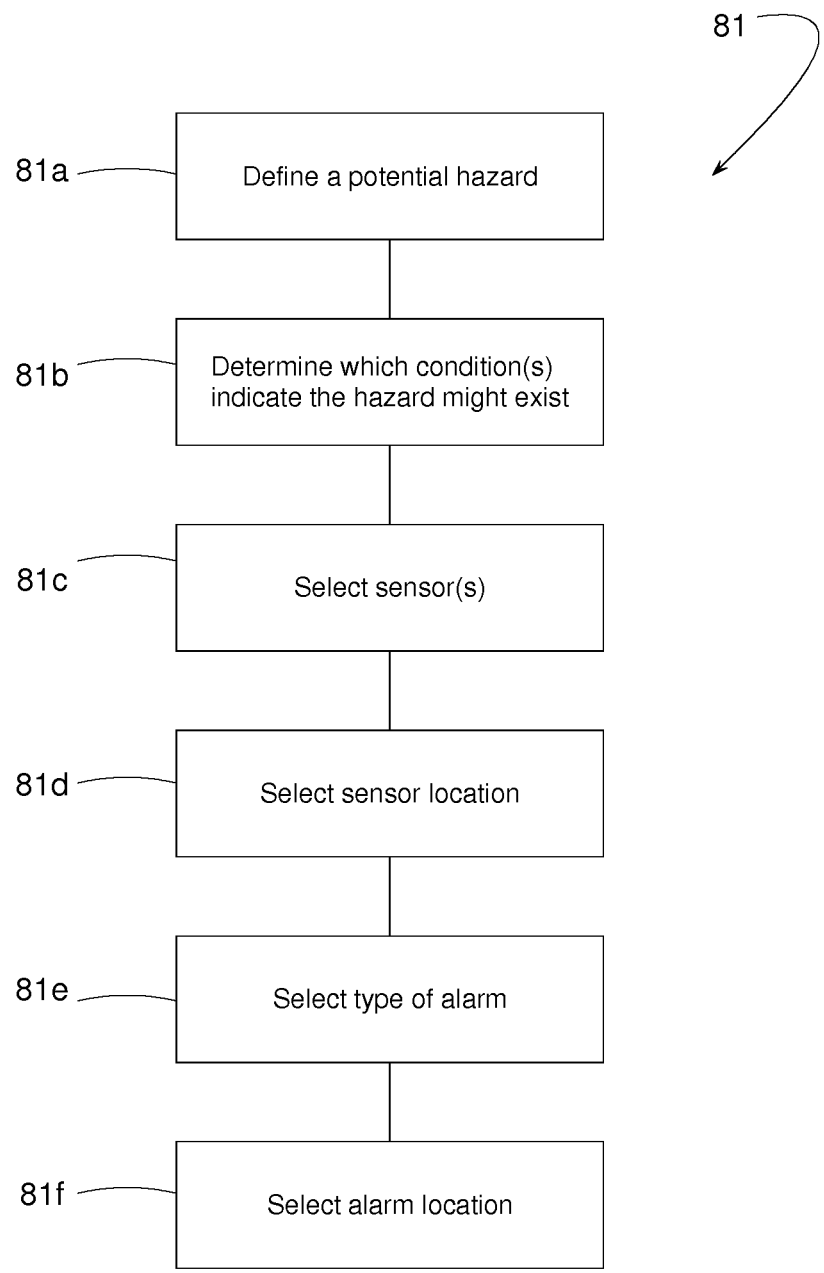
FIG. 10 is a schematic diagram illustrating a basic concept of an alarm system for a loading dock.

FIG. 10 is a diagram that schematically illustrates the basic concept of an alarm system 81 for a loading dock. As will be appreciated, some forms of signaling/alarm systems already exist on a loading dock. For example, most vehicle restraints include a light communication package to provide an indication to personnel inside the facility whether or not the restraint is engaged to secure the trailer. Thus, while the general idea of sensing and signaling in this context is known, the examples disclosed herein advance the art by, for example, more specifically identifying and warning in regard to particular hazards, or more effectively communicating hazards to allow corrective or avoidive action or for other reasons. In the previous example, sensing and signaling were provided for, inter alia, the hazard of an open dock, and a person in the immediate vicinity of the loading dock. Other particular hazards, and/or more effective communication of hazards will be discussed in regard to the generalized system 81. System 81 comprises methods or steps 81a-f, wherein step 81a is defining a potential hazard that is to be avoided, step 81b is determining which conditions indicate the hazard might exist, step 81c is selecting appropriate types of sensors that can detect the hazardous condition, step 81d is selecting appropriate locations for the sensors, step 81e is selecting an appropriate type of alarm, and step 81f is selecting the location of the alarm. There are several possible choices for each of steps 81a-f, and the resulting combinations of choices provide different examples described herein.

For step 81a, for instance, examples of potential hazards include, but are not limited to: a) vehicle restraint 54 being unlocked and a first body 32 or a second body 108 approaching doorway 12 or entering unsecured vehicle 24 (either body 32 or 108 could be a forklift, other material handling equipment, or a person), b) vehicle restraint 54 unlocked and body 32 or 108 being inside vehicle 24, c) body 32 or 108 moving within vehicle 24, d) body 32 or 108 being inside vehicle 24 but not necessarily moving, and/or e) body 108 (e.g., a forklift) being inside vehicle 24 and body 32 being nearby (and probably unable to see body 108 because it is inside vehicle 24).

For step 81b, examples of conditions that indicate one or more of the aforementioned potential hazards might exist include, but are not limited to a) the hook of vehicle restraint 54 is retracted and body 32 or 108 is moving near deck 74 or doorway 12, b) the hook of vehicle restraint 54 is retracted and body 32 or 108 is present near deck 74 or doorway 12, c) the hook of vehicle restraint 54 is retracted and body 32 or 108 is moving within vehicle 24, d) the hook of vehicle restraint 54 is retracted and body 32 or 108 is actually inside vehicle 24 but not necessarily moving, e) body 32 or 108 moving within vehicle 24 regardless of the condition of vehicle restraint 54, f) body 32 or 108 being stationary inside vehicle 24 regardless of the condition of vehicle restraint 54, g) a body is moving or stationary inside vehicle 24 while a second body is moving or stationary near deck 74 or doorway 12, and h) the presence or absence of vehicle 24 at the loading dock.

For step 81c, examples of sensors that can detect one or more of the aforementioned conditions include, but are not limited to: a) an electromechanical limit switch, b) pressure switch, c) active infrared presence detector, d) passive infrared motion detector, e) photoelectric eye, f) ultrasonic proximity sensor, g) electromagnetic radiation antenna, h) metal detector, and i) weight detector.

For step 81d, examples of locations for the aforementioned sensors include, but are not limited to: a) on or near vehicle restraint 54, b) on or near deck 74, c) on a yieldable or stationary bracket adjacent to doorway 12, d) on body 32 (e.g., on a person), and e) on body 108 (e.g., on a forklift). One or more of these positions plus other sensor mounting locations are shown in FIGS. 7 and 15-17. In cases where a sensor comprises an emitter and a receiver, the emitter can be at one of the locations just mentioned and the receiver at another. An emitter, for example, could be attached to a forklift or a person with a corresponding receiver mounted to a yieldable bracket adjacent to doorway 12, or the locations of the emitter and receiver could be reversed.

For step 81e, examples of suitable types of alarms include, but are not limited to: a) lights of different colors to indicate different conditions, b) flashing light, c) illuminated signs or icons that represent various hazards or conditions, d) conventional audio signal (e.g., siren, buzzer, horn, etc.), and e) directed audio or directional sound focused at a certain area or individual. In some cases, a person can carry some form of personalized identification such as an RFID tag that allows an alarm system to deliver a personalized message to that particular individual. The alarm, for example, might project a verbal message that mentions the individual's name or uses a language particularly suited to the individual.

For step 81f, examples of possible alarm locations include, but are not limited to: a) along a vertical edge of doorway 12, b) along an upper horizontal edge of doorway 12, c) along a continuous run extending from a side to horizontal edge of doorway 12, d) along an intermittent run extending from a side to horizontal edge of doorway 12, e) on a yieldable or fixed bracket that is elevated and spaced apart from an upper edge of doorway 12 (e.g., light 85 of FIG. 15), f) adjacent to a peripheral edge of deck 74 (e.g., light 83 of FIG. 15), g) a place where the alarm projects sound or light into vehicle 24, h) a place where the alarm projects sound or light in front of doorway 12 in the vicinity of dock leveler 34, and i) carried on or with a pedestrian being warned.

One example, for instance, might include energizing a red light visible in the loading dock area outside of vehicle 24 when body 32 or 108 is moving adjacent to or within vehicle 24 or when simply present in the vehicle, and energizing a green light when no motion and/or presence is detected. Another example might include selectively projecting lights of various color (e.g., red, green and amber) into vehicle 24 (where they can be seen by the forktruck operator) and/or into the loading dock area to indicate the situation pertaining to vehicle restraint 54 (e.g. whether it is engaged or not) and the presence or movement of body 32 or 108 within or adjacent to vehicle 24. Light 83 projects light both inside and outside of vehicle 24. Relatedly, being able to sense the presence of a vehicle or pedestrian in vehicle 24 could be tied to light or other communication outside the building so that, for example, it can be seen by the driver of vehicle 24. The vehicle restraints mentioned herein are intended to prevent a vehicle 24 from leaving the loading dock. Clearly, the restraint cannot perform this function if it is not engaged. Moreover, when it is not engaged, the driver is typically presented with a green light, indicating he is unlocked and free to depart. Accordingly, it would be beneficial to signal the driver not to leave whenever a person or forktruck is on the vehicle 24. The sensors disclosed herein could be used as a triggering signal to illuminate an outside red light (seen by the driver of vehicle 24) whenever a body is present on the trailer, irrespective of whether the vehicle restraint is engaged or not.

Figure 11:
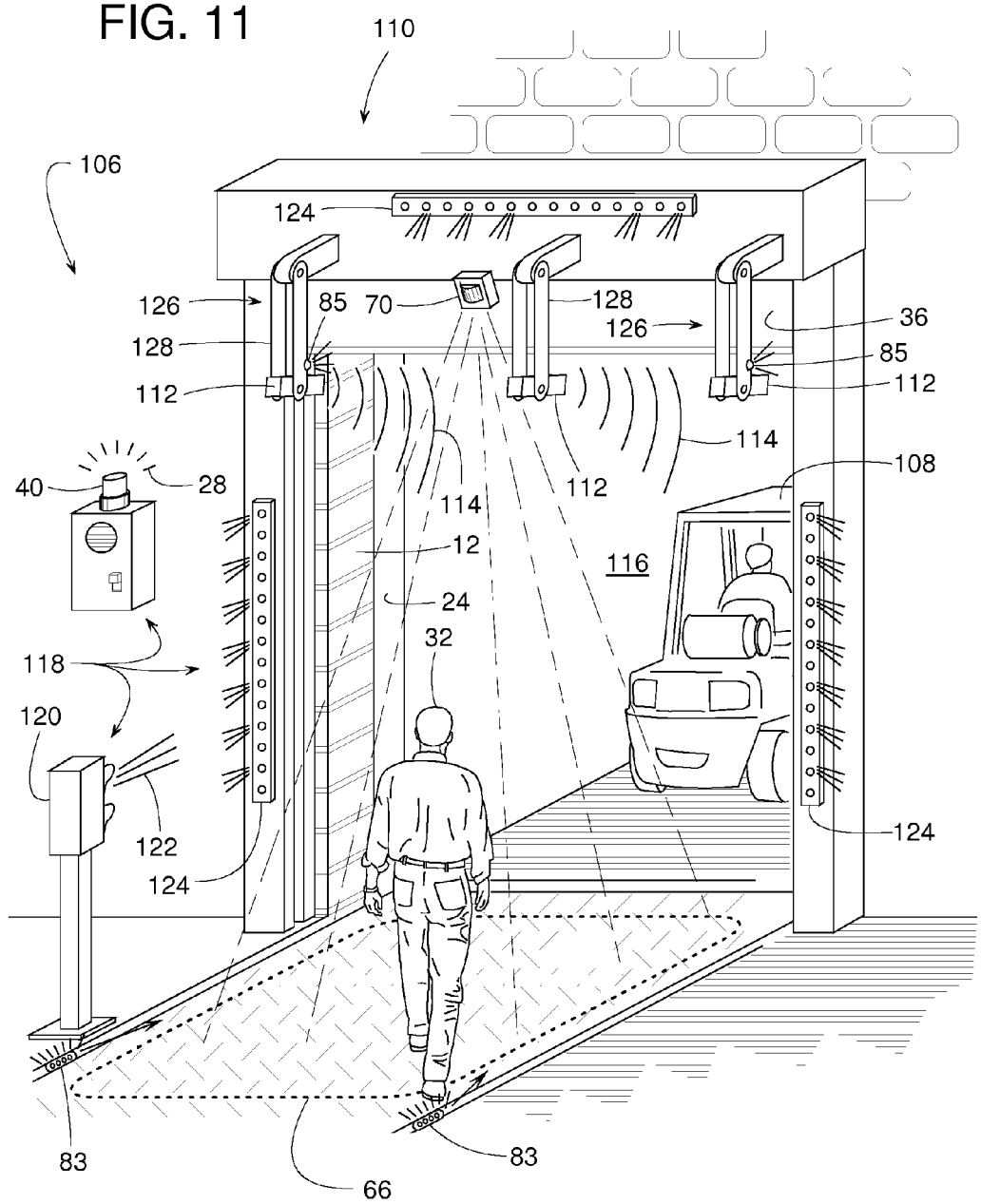
FIG. 11 is a perspective view of one embodiment of a safety system responding to a potential hazard at a loading dock and also possibly a potentially endangered person in the area.

As mentioned earlier in the description of FIG. 3, it was pointed out that in some examples, barrier 22 is omitted and door panel 36 alone can serve as a runoff barrier. FIG. 11, for instance, shows a loading dock 106 without barrier 22. In this case, door panel 36 is open and vehicle 24 is properly parked adjacent doorway 12. Nonetheless, a body 108 (e.g., forklift or other type of material-handling equipment) loading or unloading cargo from within vehicle 24 can create a potentially hazardous situation for another body 32 (e.g., a person, another forklift, etc.) that is within the area 66 adjacent doorway 12.

To avoid a collision between bodies 32 and 108, a safety system 110 warns body 32 and/or 108 of the hazard. In some examples, safety system 110 includes one or more remote body sensors 112 mounted outside of vehicle 24 and preferably inside the building. Sensors 112 each transmit a sensing signal 114 through an interior 116 of vehicle 24, wherein sensing signal 114 detects whether body 108 is inside vehicle 24. Sensor 112 can be any suitable device including, but not limited to, a long range passive infrared motion sensor that responds to the movement of body 108, or a photo-eye beam installed at an appropriate location where the beam can be interrupted as body 108 enters or leaves vehicle 24.

To warn body 32 and/or body 108 of the potential hazard, an alarm system 118 in responsive communication with sensors 112 provides a visual or audible alarm signal. Examples of alarm system 118 includes, but are not limited to, a single light 40 emitting a light signal 28, a stop/go light 120 emitting a red or green signal 122 that is visible to body 108 within vehicle 24, or one or more elongate light fixtures 124 that can be mounted along the perimeter of doorway 12, preferably parallel to the doorway's vertical or horizontal edges. Of course, countless other light arrangements and displays are also well within the scope of the invention.

To avoid sending unnecessary warnings when no body 32 is present while body 108 is loading or unloading vehicle 24, in some examples, safety system 110 includes body sensor 70 for detecting the presence of body 32 being within area 66 adjacent doorway 12. In this case, alarm system 110 provides a visual or audible alarm signal only if both bodies 32 and 108 are present. Thus, an alarm is only activated in response to the combination of both a potentially hazardous situation at loading dock 106 plus the presence of a body (e.g., body 32) that could be adversely affected by the hazard.

Sensor 112 is best mounted at a location where it can detect the presence of body 108 deep inside vehicle 24, yet sensor 112 is preferably located where it is unlikely to be struck by body 108 entering or leaving vehicle 24. It might be desirable to have two sensors 112 at the two upper corners of doorway 12 or have a single sensor 112 centrally located above the doorway. If sensor 112 is located where body 108 might strike it, sensor 112 is preferably mounted to a movable bracket 126 that can yield in response to sensor 112 being hit. Bracket 126, for example, might includes a pivotal or resilient arm 128 that can bend or swing out of the way upon being struck and afterwards automatically return to its original position. Bracket 126 can be designed to hold an individual sensor or a series of them.

Figure 12:
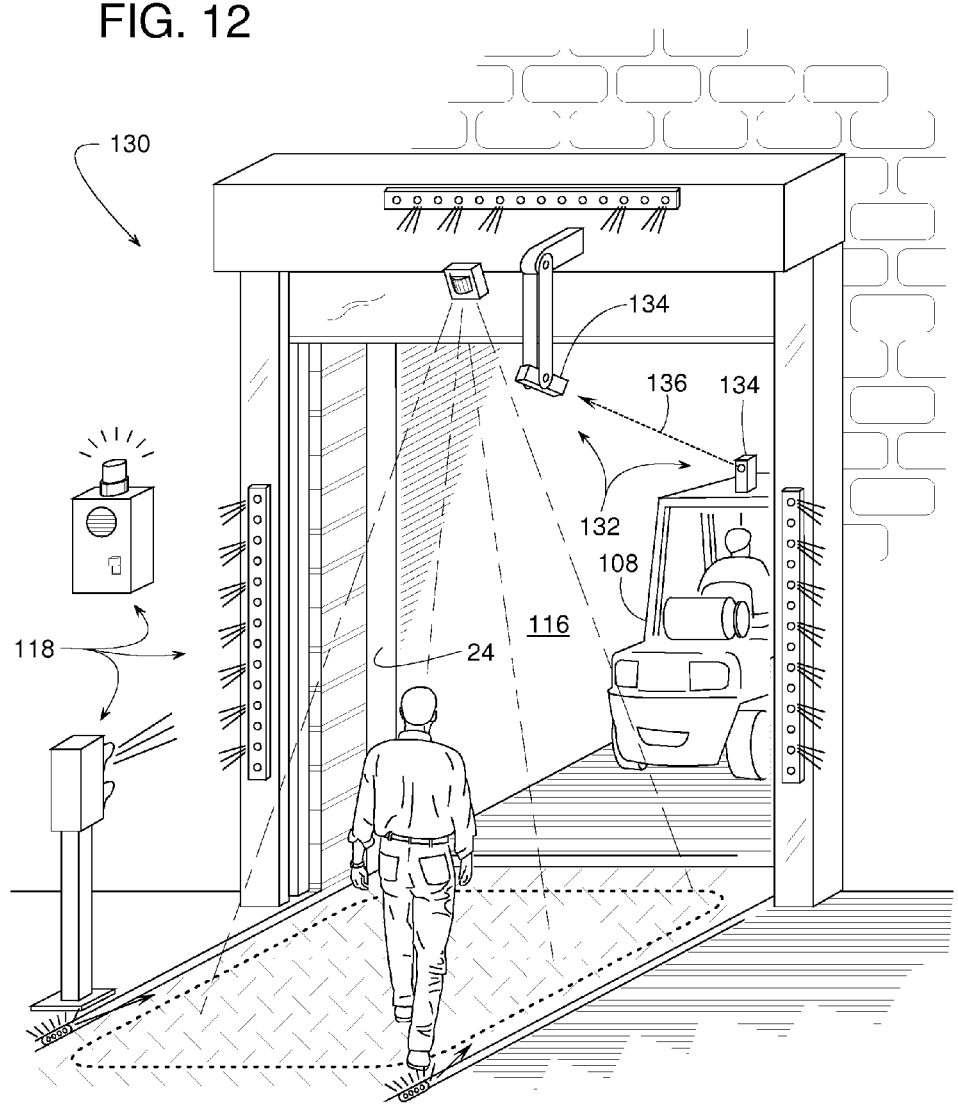
FIG. 12 is a perspective view of another embodiment of a safety system responding to a potential hazard at a loading dock and also possibly a potentially endangered person in the area.

As an alternative to mounting sensor 112 outside of vehicle 24 and "looking in," FIG. 12 shows a safety system 130 where a body sensor 132 comprises an infrared transmitter 134 mounted to body 108 and a corresponding receiver 134 installed within the building. The presence of body 108 inside vehicle 24 is detected upon transmitter 134 transmitting an infrared sensing signal 136 through interior 116 of vehicle 24 to receiver 134. Transmitter 134 is preferably mounted to the rear of body 108, with receiver 134 mounted to "look" into vehicle 24, so that body 108 is only sensed when it has penetrated all the way in to vehicle 24. Connecting alarm system 118 in responsive communication with receiver 134 enables safety system 130 to operate in a manner similar to that of system 110. It will be appreciated that mounting transmitters 134 to individuals would allow them to be sensed inside the vehicle as well.

Figure 13:
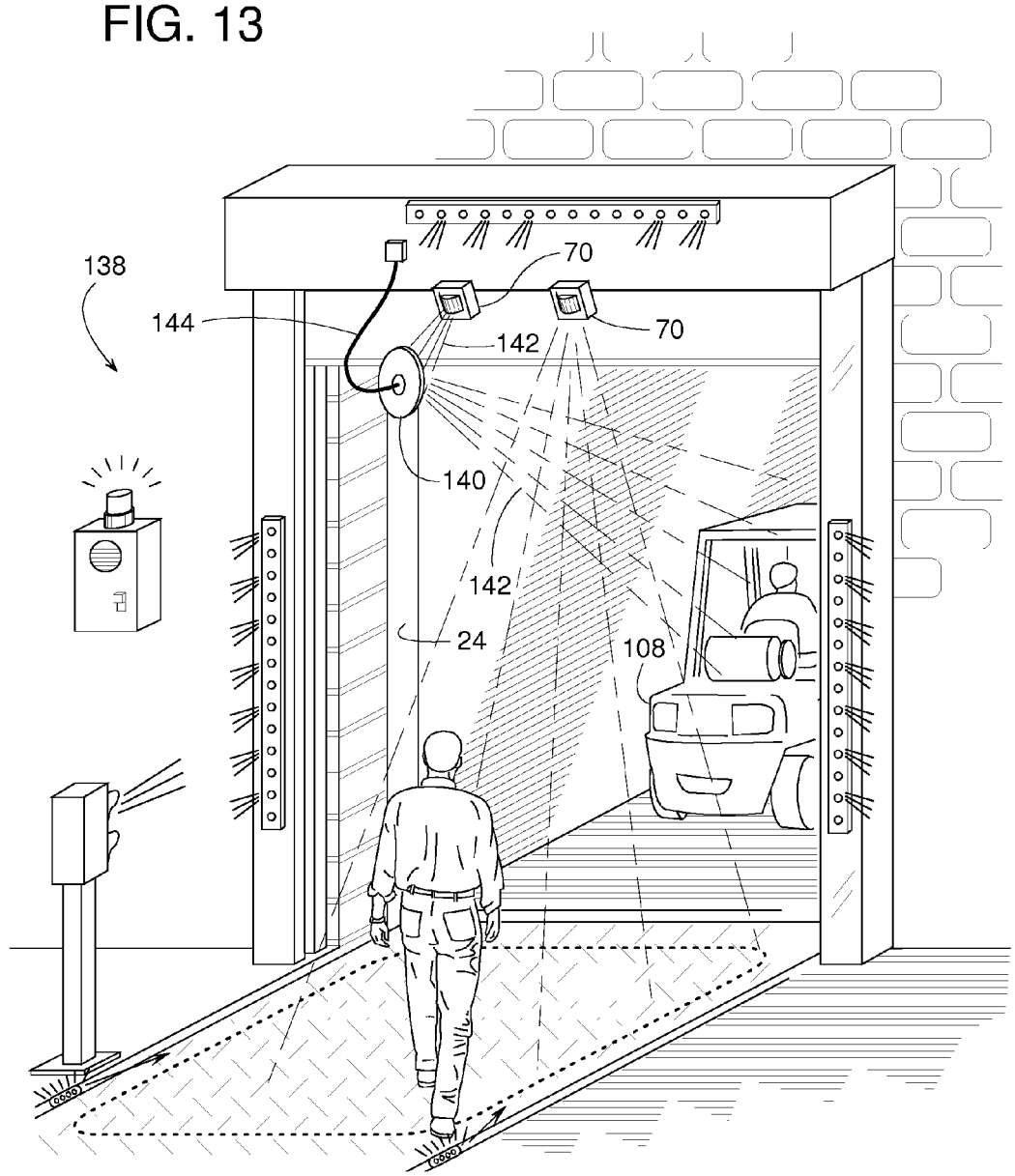
FIG. 13 is a perspective view of another embodiment of a safety system responding to a potential hazard at a loading dock and also possibly a potentially endangered person in the area.

FIG. 13 shows another safety system 138 that is similar to system 110; however, a mirror 140 reflects a sensing signal 142 from a sensor 70 to detect the presence of body 108 within vehicle 24. Mirror 140 allows sensor 70 to be mounted at a location where sensor 70 is less likely to be struck by body 108. To protect mirror 140 from damaging impact, mirror 140 can be supported by a resiliently bendable bracket 144.

FIGS. 14-17 show an example dock leveler lighting system 200 installed at a loading dock platform 202. Lighting system 200 can be used for signaling various loading dock conditions to various individuals in the vicinity of the loading dock and/or for illuminating the area around a dock leveler 204.

In some examples, lighting system 200 is controlled to emit different colors of light (e.g., red, green, yellow, etc.) to indicate different operating conditions at the dock to an individual and/or vehicle operator in the vicinity of the loading dock. A red light, for example, could indicate to a forklift or pallet jack operator intending to load or unload a trailer that the trailer is not safely secured at the dock with a vehicle restraint, a wheel restraint, or other mechanism(s). In this example, the lighting system 200 may be in communication with (e.g., via a wireless coupling and/or a wired coupling) a vehicle restraint such that the lighting system 200 provides an indication of the restraint status (e.g., engaged with, or disengaged with, a vehicle at the dock). In another example, a red light may alert a pedestrian and/or a forklift operator in the vicinity of the loading dock that a forklift in the trailer bed (and not necessarily visible to an individual in the vicinity of the loading dock) may be backing out of the trailer and into the building, helping to prevent a pedestrian-forklift or forklift-forklift collision. In this example, the lighting system 200 may be in communication with one or more sensors and/or detectors for detecting the presence of a forklift in a trailer and/or detecting the presence of a body (e.g., pedestrian, forklift) in the vicinity of the loading dock. To avoid nuisance alarms, it may be desirable to illuminate a red light only if both a forklift is detected inside a trailer and a body are detected in the vicinity of the loading dock.

In another example, a green light could indicate that a truck or trailer is secured to the dock via a restraint and is ready to be loaded or unloaded. In this example, the lighting system 200 may be in communication with the restraint such that the lighting system 200 provides an indication of the restraint status. Alternatively, a green light may also alert or indicate to a pedestrian and/or forklift operator in the vicinity of the loading dock that there is no forklift in the trailer bed (where it might not be visible to an individual in the vicinity of the loading dock). As detailed in the above example, to avoid nuisance alarms, it may be desirable to illuminate a green light only if a body is detected in the vicinity of the loading dock and a forklift or body is not detected inside a trailer.

Although the above examples are described with reference to red and green lights, different and/or additional colors may be illuminated to indicate any desired loading dock condition(s) by communicatively coupling lighting system 200 to corresponding loading dock equipment, sensors and/or detectors at the loading dock that determine different loading dock condition(s). In addition or as an alternative to different light colors, some examples of lighting system 200 are controlled to flash on and off to indicate other conditions at the dock.

Figure 14:
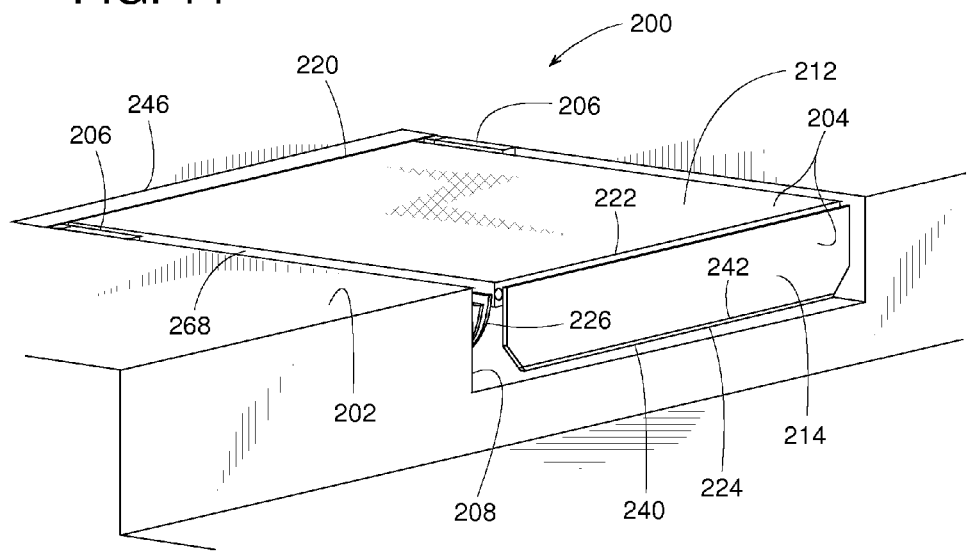
FIG. 14 illustrates a perspective view of a dock system implemented with an example light system described herein.
Figure 15:
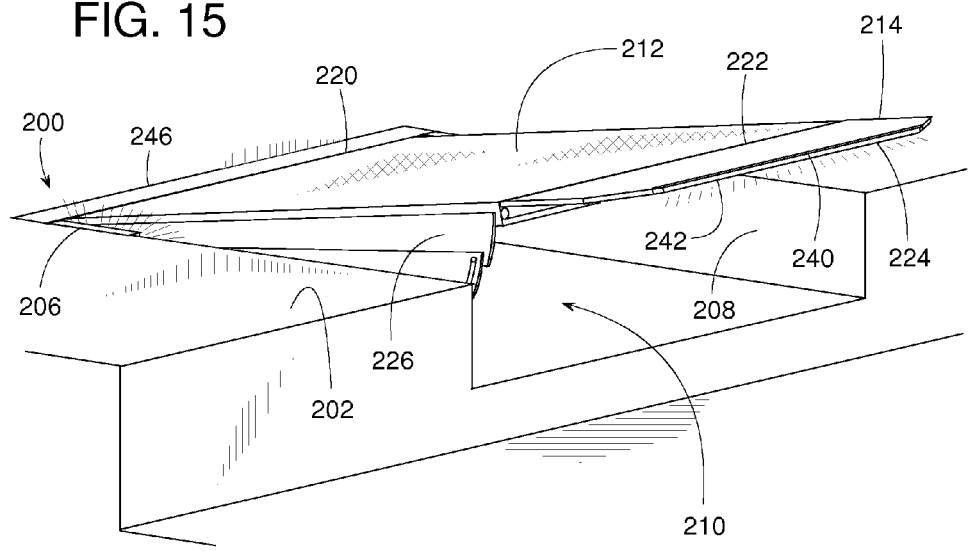
FIG. 15 illustrates the example dock system of FIG. 14 in a raised position.

In the illustrated example, system 200 includes a light fixture 206 mounted substantially stationary to a side wall 208 of a pit 210 in which dock lever 204 is installed. Dock leveler 204 comprises a vertically movable deck 212 with a lip extension plate 214 that is attached to deck 212 and movable relative thereto. The movement of deck 212 and lip extension 214 can be in translation, rotation, and/or combinations thereof. In some examples, a deck-supporting frame 216 (FIGS. 21 and 23) with a pivotal joint 218 (FIGS. 21 and 23) allows deck 212 to pivot about a rear edge 220 to adjust the elevation of its front edge 222 and lip extension plate 214 is hinged to the deck's front edge 222 so that a tip 224 of lip 214 can selectively engage and disengage a rear edge of a vehicle parked at the dock. Deck 212 is movable between a lowered position (FIG. 14) and a raised position (FIG. 15), and lip 214 is movable between a retracted position (FIG. 14) and an extended position (FIG. 15). To more clearly illustrate the major components of dock leveler 204, deck and lip actuators and deck-supporting lip keepers have been omitted in the drawings.

Some examples of dock leveler 204 include a toe guard 226 that helps cover a potential pinch point between deck 212 and dock platform 202 when deck 212 is at its raised position. In addition to providing lighting indicative of loading dock conditions, light fixture 206, when mounted in the stationary position shown in FIGS. 14-17, improves safety by illuminating toe guard 226 and thus illuminating a potential tripping hazard when deck 212 is elevated. Furthermore, when deck 212 is in a declined position relative to loading dock platform 202, light fixture 206, when mounted in the stationary position of FIGS. 14-17, is highly visible to a forklift operator exiting the trailer, thereby helping the forklift operator avoid collisions with side wall 208.

Although the actual design of light fixture 206 may vary, the example light fixture 206 illustrated in FIG. 18 comprises a light source 228 projecting light lengthwise through a light-transmitting bar 230. In some examples, light source 228 includes a dual selective color LED, e.g., part number 0130990 provided by Alert Lighting Systems (ISE Plastics & Design) of Wind Lake, Wis. Such an example light source can emit light of different colors depending on how its electrical terminals 232 are wired to a power source. Regardless of its color, a light beam emitted from light source 228 passes generally lengthwise through bar 230. As the beam travels through bar 230, a plurality of notches 234 deflects and/or disperses the light. The terms, "notch" and "notches" mean any discontinuity in bar 230. In the illustrated example, notches 234 are V-shaped; however, other examples of bar 230 have notches of other shapes including, but not limited to, square, rectangular, curved, etc.

In the examples of FIGS. 14-18 and 20-23, bar 230 is solid and rectangular. Other example cross-sectional shapes of bar 230 may include, but are not limited to, cylindrical, triangular, tubular, etc. Light fixture 236 of FIG. 19, for example, includes a light-transmitting rod 238 that is cylindrical. In some examples, bar 230 is made of substantially clear acrylic. Other examples of bar 230 are made of other materials including, but not limited to, polycarbonate, polystyrene, polyurethane, etc. Some examples of bar 230 have varying degrees of transparency, and some example bars have certain areas that are clear with other areas that are translucent or opaque. In some examples, bar 230 may be tinted.

Figure 22:
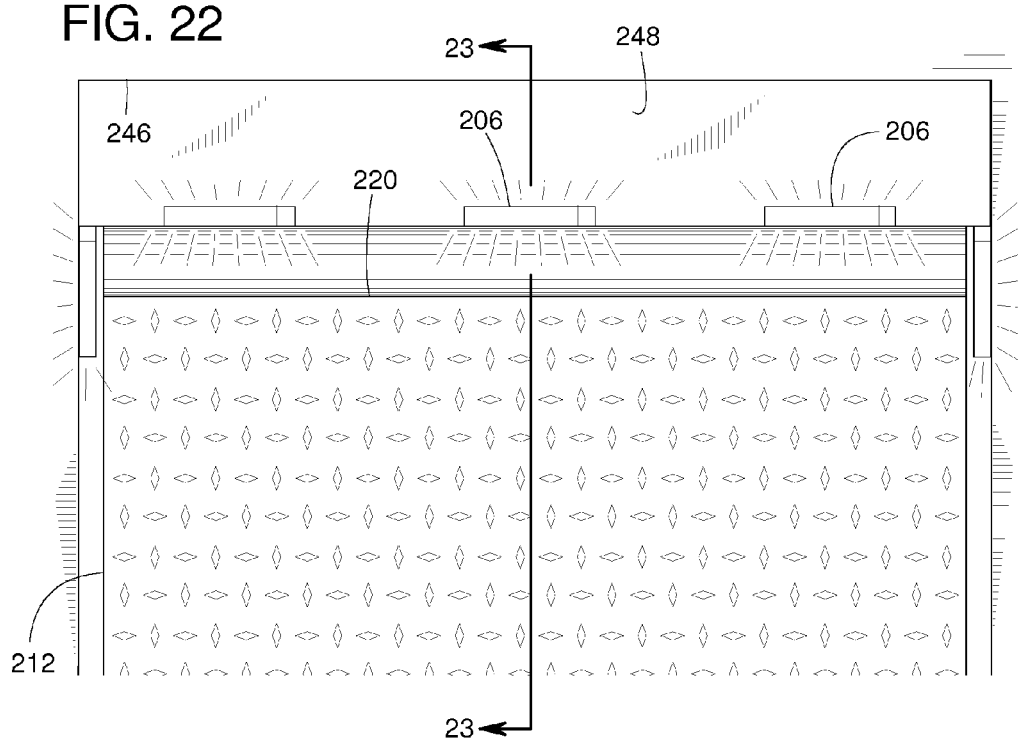
FIG. 22 illustrates the example light system of FIGS. 14-17 but implemented on the dock system at yet another location than as shown in FIGS. 14-17 and FIGS. 20-21.
Figure 23:
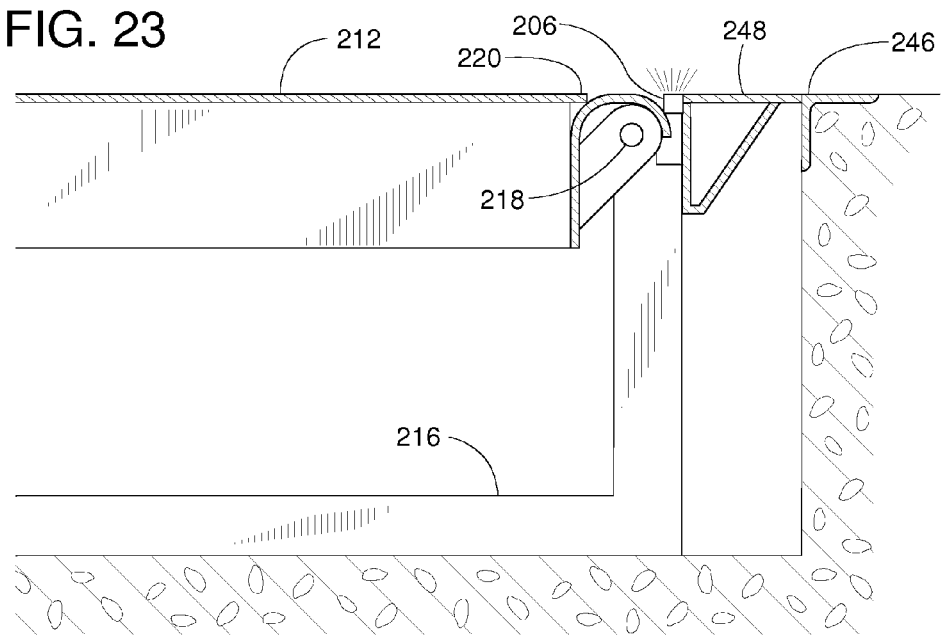
FIG. 23 is a cross-sectional view of the light system and dock system of FIG. 22 taken along line 23-23.

Additionally or alternatively, lighting system 200 may include light fixtures of other designs and/or light fixtures mounted at other locations. FIGS. 14-16, for instance, show an example light fixture 240 attached (fixedly or pivotally) to the tip of lip extension 214. At this location, light fixture 240 provides a dockworker or forklift operator inside the vehicle's cargo bay a clear signal as to whether lip 214 is resting upon the floor of the vehicle's cargo bay and/or provides a dockworker or forklift operator inside the vehicle's cargo bay with a highly visible indication of loading dock conditions. In the example where a light-transmitting rod 242 of fixture 240 is made of clear polyurethane, such a material further provides lip 214 with a shock absorbing tip that softens the impact of a forklift traveling across it. FIGS. 20 and 21 show light fixtures 206 installed within notched-out areas between a transition plate 244 and an edge 246 of dock platform 202. FIGS. 22 and 23 show light fixtures 206 installed within notched-out areas between a transition plate 248 and rear edge 220 of deck 212. Light fixtures near the deck's rear edge 220, as shown in FIGS. 20-23, provide an early signal of loading dock conditions to dockworkers walking or otherwise traveling between platform 202 and deck 212 (and to a vehicle parked at the dock.).

Additionally or alternatively, FIG. 24 shows an example dock leveler lighting system 250 that includes a light fixture 252 installed at a stationary location underneath a deck 254. For visual clarity, deck 254 is shown slightly raised and a portion of lip 214 is cut away. In this example, light fixture 252 connects to frame 216 and projects light up (e.g., in an upwardly direction) through one or more light-transmitting passageways examples of which include, but are not limited to, holes or openings 256 through deck 254 and/or a gap 258 between deck 254 and platform 202. In this example, a single light fixture provides a plurality of light spots or areas atop and/or around deck 254. Keeping light fixture 252 stationary while deck 254 moves or changes elevation increases or decreases the amount or intensity (e.g., a perceived intensity and/or a controlled intensity) of light or lumens that illuminate or shine through openings 256 and/or gap 258. Thus different amounts or intensity of light can indicate whether deck 254 is in a raised position or a lowered position. Furthermore, the light intensity can be modulated according to one or more patterns to indicate corresponding condition(s). Additionally, light fixture 252 can provide an indication of loading dock conditions, as detailed above in connection with other examples.

FIGS. 25-28 show how an example deck seal 260 can be used with an example dock leveler lighting system 262. In this example, a channel 264 designed for holding seal 260 is also used for holding an example light fixture 266 comprising a light-transmitting bar 276 and light source 228. Seal 260 is schematically illustrated to encompass any element that helps block off a gap between platform 202 and a lateral edge 268 of deck 212. Examples of seal 260 include, but are not limited to, an elongate foam pad, a strip of flexible material, a brush, combinations thereof, and/or any other suitable seal(s).

For the illustrated example, seal 260 includes a root 270 that fits within channel 264, which is attached to lateral edge 268 of deck 212. Thus channel 264 connects seal 260 to deck 212. As deck 212 rises or descends, a distal edge of seal 260 slides in sealing contact along side wall 208 of pit 210. In other examples, channel 264 is attached to side wall 208, and the distal edge of seal 260 slides against the deck's lateral edge 268 or against the deck's toe guard 226 (FIGS. 14 and 15).

Regardless of whether channel 264 is attached to wall 208 or deck 212, channel 264 retains or holds bar 276 of fixture 266. In some examples, bar 276 comprises a lens 272 and root 270 that are an integral extension of each other such that lens 272 and root 270 are a unitary piece. Such a unitary piece lends itself to being produced by an extrusion process with perhaps a secondary operation to add a series of light deflecting notches 274. Upon installing light fixture 266, root 270 engages channel 264 to position lens 272 between platform 202 and the deck's lateral edge 268. In examples where channel 264 connects light fixture 266 to the deck's lateral edge 268, bar 276 rises above the surface of platform 202 when deck 212 is in its raised position, whereby fixture 266 projects light upon the platform's surface to indicate that deck 212 is elevated. Furthermore, light fixture 266 can provide an indication, or signal, of loading dock conditions, which will be particularly visible to an individual, or a body on the loading dock platform.

Figure 27:
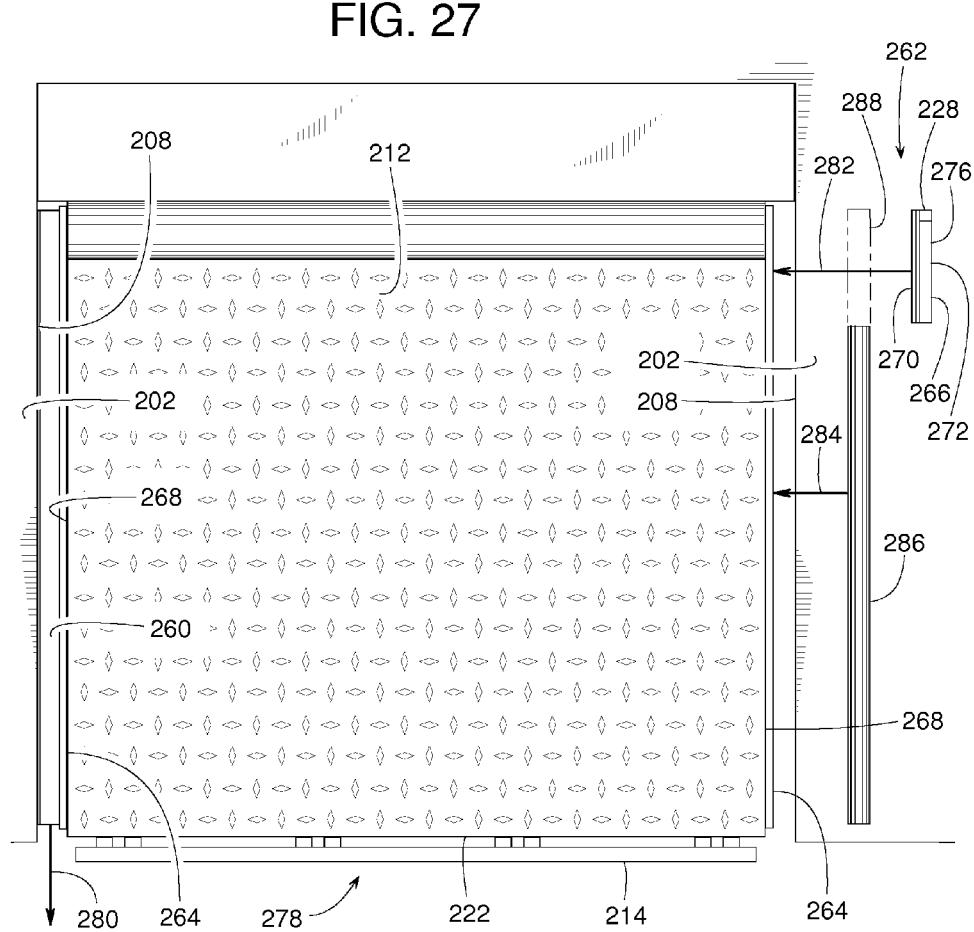
FIG. 27 illustrates a dock system retrofitted with an example light system described herein.
Figure 28:
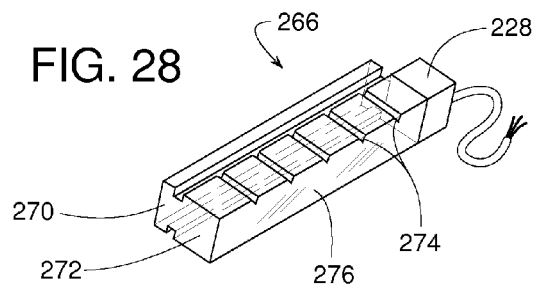
FIG. 28 is a perspective view of the example light system of FIG. 27.

The example light fixtures described herein may be factory installed or retrofit with dock levelers in the field. For example, FIG. 27 shows an example of how a dock leveler 278 can be retrofitted with lighting system 262. In this example, arrow 280 represents removing at least a portion of seal 260 to provide space for light fixture 266 on channel 264, arrow 282 represents attaching light fixture 266 to channel 264. Arrow 284 represents replacing seal 260 with a shorter replacement seal 286 to provide room for both light fixture 266 and replacement seal 286 on channel 264. In some examples, shorter replacement seal 286 may be formed by removing (e.g., cutting) a section 288 of seal 260. In other examples, shorter replacement seal 286 is a new piece while original seal 260 is simply discarded.

At least some of the aforementioned examples include one or more features and/or benefits including, but not limited to, the following:

In some examples a safety system for a building's loading dock warns dockworkers inside the building when a falling hazard exists due to the door or barrier being open while there is no truck present at the dock.

In some examples, the dock includes a barrier in addition to a door, and in other examples the door itself serves as a barrier and the additional barrier is omitted.

In some examples, the barrier is attached to the door, and in other examples the barrier is mounted separate from the door.

In some examples, a sensor determines whether a truck or other type of vehicle is within a certain distance of the doorway, wherein the certain distance is sufficient for the lip of a dock leveler to rest upon the truck bed.

In some examples, a sensor determines whether a truck or other type of vehicle is within a certain distance of the doorway, wherein the certain distance is sufficient for a vehicle restraint to engage a truck's ICC bar (rear impact guard).

In some examples, a sensor determines whether a body crosses a line of sight to enter an area or come within a certain distance of the doorway.

In some examples, a remote body sensor in the form of a strain gage or scale associated with a dock leveler determines when the weight of a person or object is on the dock leveler's deck, whereby the sensor can determine whether the body is near the doorway.

In some examples, the safety system is unresponsive to a remote body sensor when the door is closed.

In some examples, the safety system uses both visual and audible alarms to signify different levels of possible danger.

In some examples, the safety system provides a timestamp that identifies when a hazardous situation may have occurred.

In some examples, the safety system "looks" inside a trailer to determine if a forklift or other material handling equipment is present.

In some examples, a safety system sends a forklift-sensing signal into a trailer, and in other examples, the signal originates from the forklift and is transmitted outwardly through the trailer. In either case, the signal is used for determining whether the forklift (or other type of material-handling equipment) is operating within the trailer.

In some examples, the safety system only generates an alarm when the combination of both a potential hazard and a potentially endangered person are at a loading dock.

In some examples, an elongate light illuminates the perimeter of a loading dock doorway to indicate that a hazard, such as a forklift operating inside a trailer, might be near the doorway.

Although the invention is described with reference to preferred examples, it should be appreciated by those of ordinary skill in the art that various modifications are well within the scope of the invention. Therefore, the scope of the invention is to be determined by reference to the following claims:

The invention claimed is:

1. A dock leveler lighting system for use at a loading dock platform, the dock leveler lighting system comprising:
   a deck mountable for movement relative to the loading dock platform such that the deck is selectively moveable between a raised position and a lowered position; and
   a light fixture being substantially stationary relative to the loading dock platform and being interposed between a gap defined by a side surface of the deck and a side surface of the loading dock platform, the light fixture to illuminate at least a portion of the deck.

2. The dock leveler lighting system of claim 1, wherein the loading dock platform defines a pit lined by a pit wall, and the light fixture is attached to the pit wall.

3. The dock leveler lighting system of claim 1, wherein the deck includes a front edge and a rear edge, the deck pivots about the rear edge to adjust the elevation of the front edge, and the light fixture is interposed between the rear edge of the deck and the loading dock platform.

4. The dock leveler lighting system of claim 3, further comprising a transition plate extending between the rear edge of the deck and the loading dock platform, and the light fixture is interposed between the transition plate and the loading dock platform.

5. The dock leveler lighting system of claim 3, further comprising a transition plate extending between the rear edge of the deck and the loading dock platform, and the light fixture is interposed between the transition plate and the rear edge of the deck.

6. The dock leveler lighting system of claim 1, further comprising a toe guard supported by the deck, and the light fixture is positioned to project light upon the toe guard when the deck is at the raised position.

7. The dock leveler lighting system of claim 1, wherein the light fixture comprises a light source projecting light lengthwise through a light-transmitting bar.

8. A dock leveler lighting system for use at a loading dock platform, the dock leveler lighting system comprising:
a deck mountable for movement relative to the loading dock platform such that the deck is selectively moveable between a raised position and a lowered position; and
a light fixture being substantially stationary relative to the loading dock platform and being positioned underneath the deck to illuminate at least a portion of the deck.

9. The dock leveler lighting system of claim 8, wherein the deck defines a plurality of openings through which the light fixture projects light with a different amount of lumens passing through the openings when the deck is in the raised position than when the deck is in the lowered position.

10. The dock leveler lighting system of claim 8, wherein the deck and the loading dock platform define a gap through which the light fixture projects light.

11. The dock leveler lighting system of claim 8, further comprising a stationary frame to which the deck is attached, and the light fixture is mounted to the stationary frame.

12. A dock leveler lighting system for use at a loading dock platform, the dock leveler lighting system comprising:
a deck mountable for movement relative to the loading dock platform such that the deck is selectively moveable between a raised position and a lowered position;
a lip extension plate attached to the deck and being moveable relative thereto; and
a light fixture coupled to the lip extension plate to illuminate at least a portion of the deck.

13. The dock leveler lighting system of claim 12, wherein the deck includes a front edge and a rear edge, the deck pivots about the rear edge to adjust the elevation of the front edge, and the lip extension plate is hinged to the front edge of the deck.

14. A dock leveler lighting system for use at a loading dock platform, the dock leveler lighting system comprising:
a deck mountable for movement relative to the loading dock platform such that the deck is selectively moveable between a raised position and a lowered position; and
a light fixture coupled to a lateral edge of the deck between the lateral edge and a side of the dock when the deck is substantially horizontal to illuminate at least a portion of the deck, the light fixture and the deck to move as a unit, the light fixture being above the loading dock platform when the deck is in the raised position, and the light fixture being below the dock platform when the deck is in the lowered position.

15. The dock lighting system of claim 14, further comprising a channel adjacent the lateral edge of the deck to retain a seal, the light fixture comprises a light source projecting light lengthwise through a light-transmitting bar, and the light-transmitting bar is connected to the channel.

16. The dock lighting system of claim 15, wherein the light-transmitting bar comprises a lens and a root that are an integral extension of each other such that the lens and the root are a unitary piece, the root engages the channel and the lens is interposed between the loading dock platform and the lateral edge of the deck.

17. A method of providing a dock leveler with a dock lighting system, wherein the dock leveler is installed within a pit lined by a pit wall, the dock leveler includes a deck that is movable relative to a loading dock platform adjacent the pit, a lateral edge of the deck includes a channel that positions a seal between the lateral edge of the deck and the pit wall, the method comprising: attaching a light fixture to the channel to illuminate at least a portion of the deck.

18. The method of claim 17, further comprising removing a portion of the seal to provide room for the light fixture.

19. The method of claim 17, further comprising replacing the seal with a shorter replacement seal to provide room for the light fixture.

* * * * *